(12) United States Patent
Sasaki et al.

(10) Patent No.: US 11,856,157 B2
(45) Date of Patent: Dec. 26, 2023

(54) IMAGE READING APPARATUS WITH CONTROL DEVICE TO DETERMINE OPEN / CLOSED STATE OF COVER BASED ON EVALUATION OF READ VALUES IN MAIN SCAN DIRECTIN WITH LIGHT SOURCE TURNED ON AND OFF

(71) Applicants: Hironori Sasaki, Kanagawa (JP); Ayako Ikeda, Kanagawa (JP)

(72) Inventors: Hironori Sasaki, Kanagawa (JP); Ayako Ikeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/188,773

(22) Filed: Mar. 23, 2023

(65) Prior Publication Data
US 2023/0336666 A1 Oct. 19, 2023

(30) Foreign Application Priority Data
Apr. 14, 2022 (JP) .................................. 2022-067073

(51) Int. Cl.
*H04N 1/00* (2006.01)
*H04N 1/028* (2006.01)

(52) U.S. Cl.
CPC ....... *H04N 1/00013* (2013.01); *H04N 1/0009* (2013.01); *H04N 1/00037* (2013.01); *H04N 1/00068* (2013.01); *H04N 1/00076* (2013.01); *H04N 1/00551* (2013.01); *H04N 1/02815* (2013.01)

(58) Field of Classification Search
None
See application file for complete search history.

(56) References Cited

U.S. PATENT DOCUMENTS

| 7,567,366 | B2 * | 7/2009 | Okamura | ........... | H04N 1/00896 |
| | | | | | 372/38.1 |
| 9,565,329 | B2 * | 2/2017 | Yamada | ............. | H04N 1/00737 |
| 9,723,164 | B2 * | 8/2017 | Misaka | ............. | H04N 1/00708 |
| 9,979,845 | B2 * | 5/2018 | Maeda | ................. | H04N 1/0306 |
| 9,979,857 | B2 * | 5/2018 | Sato | ........................ | H04N 1/125 |

(Continued)

FOREIGN PATENT DOCUMENTS

| JP | 9-200448 | 7/1997 |
| JP | 2002-271589 | 9/2002 |

(Continued)

*Primary Examiner* — Scott A Rogers
(74) *Attorney, Agent, or Firm* — IPUSA, PLLC

(57) ABSTRACT

An image reading apparatus includes a cover, a reading device including a light source and a sensor, and a control device including circuitry. The circuitry acquires first data with the light source turned off, acquires second data with the light source turned on, calculates a first evaluation value for each of plural locations of the first data, calculates a second evaluation value for each of plural locations of the second data, determines an open or closed state of the cover based on the first evaluation value and the second evaluation value, determines that the cover is open when at least one of a determination result based on the first evaluation value or a determination result based on the second evaluation value indicates the open state of the cover, and determines that the cover is closed when the two determination results both indicate the closed state of the cover.

9 Claims, 14 Drawing Sheets

(56) References Cited

U.S. PATENT DOCUMENTS

| | | | |
|---|---|---|---|
| 2003/0010903 A1* | 1/2003 | Hsu | H04N 1/00519 250/222.1 |
| 2004/0169901 A1* | 9/2004 | Kim | H04N 1/0005 358/509 |
| 2006/0017987 A1* | 1/2006 | Chen | H04N 1/00551 358/474 |
| 2010/0053706 A1* | 3/2010 | Jasinski | H04N 1/00087 358/498 |
| 2012/0013955 A1 | 1/2012 | Ikeda | |
| 2013/0170000 A1 | 7/2013 | Kurakata et al. | |

FOREIGN PATENT DOCUMENTS

| | | |
|---|---|---|
| JP | 2006-311316 | 11/2006 |
| JP | 2010-273028 | 12/2010 |
| JP | 2015-023395 | 2/2015 |
| JP | 2018-137793 | 8/2018 |
| JP | 2019-121824 | 7/2019 |

* cited by examiner

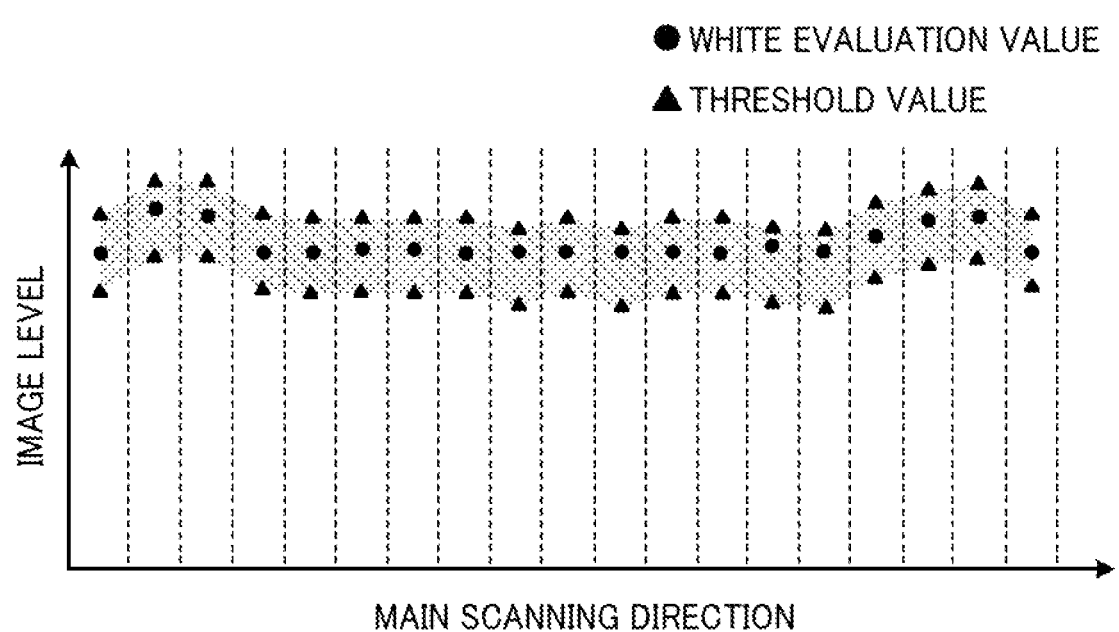

IMAGE READING APPARATUS WITH CONTROL DEVICE TO DETERMINE OPEN / CLOSED STATE OF COVER BASED ON EVALUATION OF READ VALUES IN MAIN SCAN DIRECTIN WITH LIGHT SOURCE TURNED ON AND OFF

CROSS-REFERENCE TO RELATED APPLICATION

This patent application is based on and claims priority pursuant to 35 U.S.C. § 119(a) to Japanese Patent Application No. 2022-067073, filed on Apr. 14, 2022, in the Japan Patent Office, the entire disclosure of which is hereby incorporated by reference herein.

BACKGROUND

Technical Field

Embodiments of this disclosure relate to an image reading apparatus.

Related Art

There is a sheet-through image reading apparatus that transports a document with an automatic document feeder (ADF) and reads the document. Such an image reading apparatus includes an openable and closable cover over a document transport path to allow a user to remove the document when the document is jammed.

If a document reading operation takes place when the openable and closable cover included in the ADF is open, a normal image may fail to be obtained, or the document may be damaged. Therefore, the image reading apparatus may be provided with a sensor that detects the open state or the closed state of the cover in order to execute the reading operation when the cover is closed. With the sensor that detects the open state or the closed state of the cover, however, the image reading apparatus is complicated in structure and increased in cost. To simplify the structure and reduce the cost, therefore, there is a technique of detecting the open state or the closed state of the cover of the image reading apparatus without the sensor that detects the open state or the closed state of the cover.

As an example of the technique of detecting the open state or the closed state of the cover of the image reading apparatus without the sensor that detects the open state or the closed state of the cover, there is a technique of irradiating an openable and closable member (i.e., a cover) with the light of a lamp and determining the open state or the closed state of the cover based on the maximum value and the minimum value in the main scanning direction of the amount of light received by a charge coupled device (CCD) or the fluctuation range in the main scanning direction of the received light amount.

The above-described technique is based on a theory that, when the cover is open, there is a distance between a sensor and a background plate, which prevents the reflected light from the background plate from entering the sensor and thus reduces the output of the sensor. If there is bright ambient light such as fluorescent light in a room, however, the output of the sensor may be increased, in which case the open state or the closed state of the cover may be erroneously determined.

SUMMARY

In one embodiment of this invention, there is provided an image reading apparatus that includes, for example, a cover, a reading device, and a control device. The cover is openable and closable relative to a particular portion of a transport path for transporting a document. The reading device includes a light source and a sensor. The sensor detects reflected light of light emitted toward the document from the light source and obtain a read value. The control device controls operation of the reading device. The control device includes circuitry. The circuitry acquires, as first data, the read value in a main scanning direction obtained through detection by the sensor with the light source turned off, and acquires, as second data, the read value in the main scanning direction obtained through detection by the sensor with the light source turned on. The circuitry further calculates a first evaluation value for each of a plurality of locations in the main scanning direction of the first data based on the first data in the plurality of locations in the main scanning direction, and calculates a second evaluation value for each of a plurality of locations in the main scanning direction of the second data based on the second data in the plurality of locations in the main scanning direction. The circuitry further determines an open state or a closed state of the cover based on the first evaluation value, and determines the open state or the closed state of the cover based on the second evaluation value. When at least one of a determination result based on the first evaluation value or a determination result based on the second evaluation value indicates the open state of the cover, the circuitry determines that the cover is in the open state. When the determination result based on the first evaluation value and the determination result based on the second evaluation value both indicate the closed state of the cover, the circuitry determines that the cover is in the closed state.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 9 is a graph illustrating an operation of the control device of the first embodiment to perform threshold determination of the white evaluation value;

Figure 1:
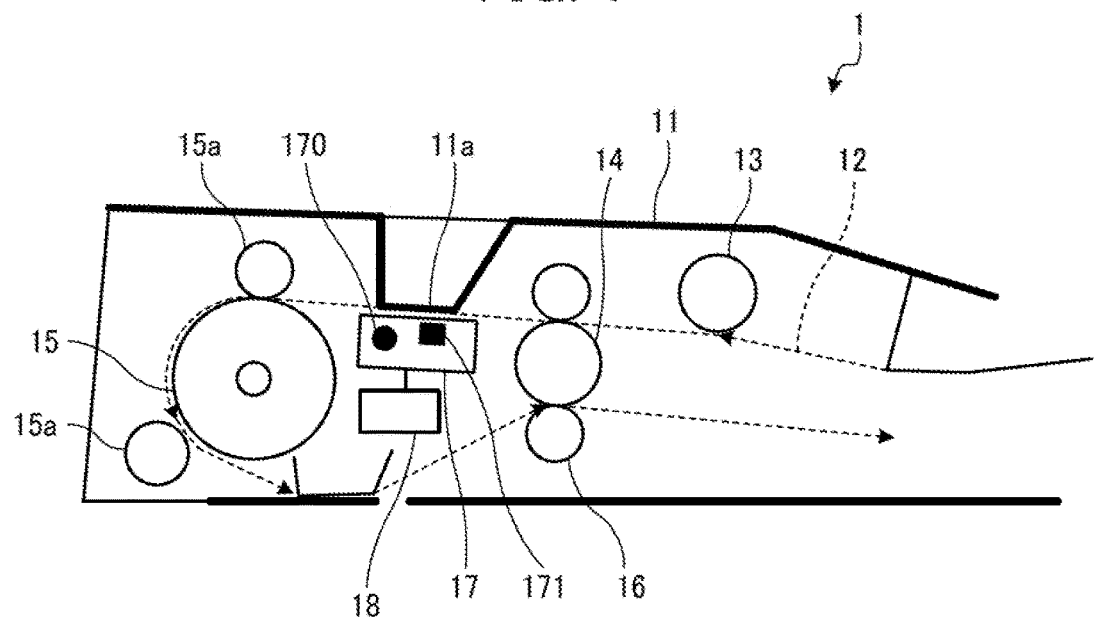
FIG. 1 is a diagram illustrating an exemplary overview of a general structure of an image reading apparatus according to a first embodiment of the present invention.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A first embodiment of the present invention will be described.

FIG. 1 is a diagram illustrating an exemplary overview of a general structure of an image reading apparatus 1 according to the first embodiment. An overview of the general structure of the image reading apparatus 1 according to the first embodiment will be described with reference to FIG. 1.

The image reading apparatus 1 illustrated in FIG. 1 is a sheet-through image reading apparatus that transports a document with an automatic document feeder (ADF) and performs a reading operation on the document. As illustrated in FIG. 1, the image reading apparatus 1 includes a cover 11, a transport path 12, a feed roller 13, transport rollers 14 and 15, pressure rollers 15a, an ejection roller 16, a reading module 17, and a control device 18.

The cover 11 is a covering member that opens and closes to block ambient light in a particular portion of the transport path 12. The cover 11 includes a white background plate 11a at a position facing the reading module 17. Later-described white data refers to image data of the background plate 11a.

The transport path 12 indicated by broken lines in FIG. 1 is a path on which a document as a reading target is transported. The feed roller 13 is a roller that feeds the document set on the image reading apparatus 1 to the transport path 12. The transport roller 14 is a roller that transports the document fed by the feed roller 13 to a reading position of the reading module 17.

The transport roller 15 is a roller with which the document subjected to a reading process of the reading module 17 is transported in the circumferential direction with the pressure rollers 15a driven by the transport roller 15 and pressed against the document to transmit the rotational force of the transport roller 15 to the document. The ejection roller 16 is a roller that ejects the document transported by the transport roller 15 to the outside of the image reading apparatus 1.

The reading module 17 is a reading device that performs the reading process on the transported document at the particular reading position on the transport path 12. As illustrated in FIG. 1, the reading module 17 includes a light source 170 and an image reading sensor 171. The light source 170 emits light. The image reading sensor 171 detects reflected light of the light emitted from the light source 170. With the image reading sensor 171 detecting the light emitted from the light source 170 and reflected by the document, the image of the document is read.

The control device 18 is a controller that controls operation of the reading module 17. The control device 18 further receives data (read values) read by the reading module 17, and determines the open state or the closed state of the cover 11 based on the data (later-described black data and white data).

As illustrated in FIG. 1, as the cover 11 is opened, the distance between the background plate 11a and the reading module 17 increases.

Figure 2:
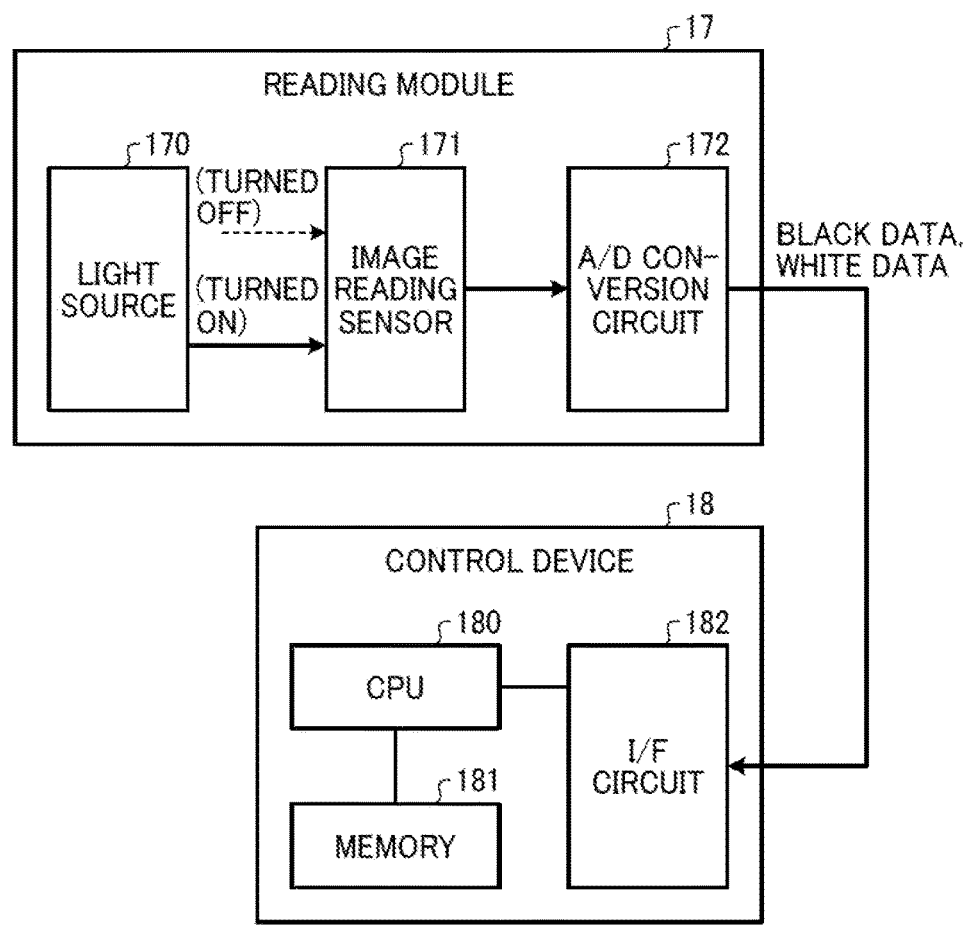
FIG. 2 is a diagram illustrating an example of a hardware configuration of a control device and a reading module included in the image reading apparatus of the first embodiment.

FIG. 2 is a diagram illustrating an example of a hardware configuration of the control device 18 and the reading module 17 according to the first embodiment. A hardware configuration of the control device 18 and the reading module 17 in the image reading apparatus 1 of the first embodiment will be described with reference to FIG. 2.

As illustrated in FIG. 2, the reading module 17 includes the light source 170, the image reading sensor 171, and an analog-to-digital (A/D) conversion circuit 172.

The light source 170 is a light source that emits light, such as a light emitting diode (LED).

The image reading sensor 171 is a reading sensor, such as a charge-coupled device (CCD) or a complementary metal oxide semiconductor (CMOS), that detects the reflected light of the light emitted from the light source 170. The image reading sensor 171 transmits analog data obtained through the reading process to the A/D conversion circuit 172.

The A/D conversion circuit 172 is an electronic circuit that converts the analog data obtained through the reading process of the image reading sensor 171 into digital data (read values) and outputs the digital data to the control device 18.

In the first embodiment, before the reading process on the document, the control device 18 acquires, as the black data, the digital data converted by the A/D conversion circuit 172 from the analog data obtained through the reading process performed at least in the main scanning direction by the image reading sensor 171 with the light source 170 turned off. Further, before the reading process on the document, the control device 18 acquires, as the white data, the digital data converted by the A/D conversion circuit 172 from the analog data obtained through the reading process performed at least in the main scanning direction by the image reading sensor 171 with the light source 170 turned on. Each of the black data and the white data may include data in the sub-scanning direction as well as the data in the main scanning direction.

As illustrated in FIG. 2, the control device 18 includes a central processing unit (CPU) 180, a memory 181, and an interface (I/F) circuit 182.

The CPU 180 is an arithmetic device that controls overall operation of the control device 18. For example, the CPU 180 acquires the black data and the white data from the reading module 17 via the I/F circuit 182, and executes a process of determining the open state or the closed state of the cover 11 based on the black data and the white data.

The memory 181 is a nonvolatile storage device that stores various data and programs executed by the CPU 180.

The I/F circuit 182 is an interface circuit that controls the input and output of data. For example, the I/F circuit 182 receives the image data acquired through the reading process of the reading module 17. The image data includes the black data and the white data.

The hardware configuration of the reading module 17 and the control device 18 illustrated in FIG. 2 is illustrative. Each of the reading module 17 and the control device 18 may include a component other than those illustrated in FIG. 2.

Figure 3:
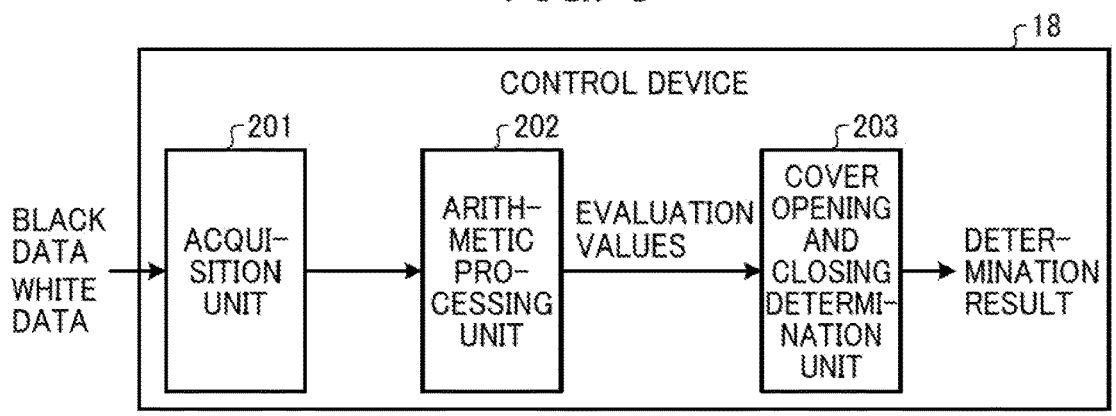
FIG. 3 is a diagram illustrating a configuration example of functional blocks of the control device of the first embodiment.

FIG. 3 is a diagram illustrating a configuration example of functional blocks of the control device 18 according to the first embodiment. A configuration of the functional blocks of the control device 18 according to the first embodiment will be described with reference to FIG. 3.

As illustrated in FIG. 3, the control device 18 includes an acquisition unit 201, an arithmetic processing unit 202 (an example of a first calculation unit), and a cover opening and closing determination unit 203 (a determination unit).

The acquisition unit 201 is a functional unit that acquires the black data (first data) and the white data (second data) from the reading module 17 via the I/F circuit 182. The acquisition unit 201 is implemented by the CPU 180 in FIG. 2 executing a program, for example.

The arithmetic processing unit 202 is a functional unit that calculates, from the black data and the white data acquired by the acquisition unit 201, a black evaluation value (a first evaluation value) and a white evaluation value (a second evaluation value) for use in the process of determining the open state or the closed state of the cover 11. The arithmetic processing unit 202 is implemented by the CPU 180 in FIG. 2 executing a program, for example.

The cover opening and closing determination unit 203 is a functional unit that performs the process of determining the open state or the closed state of the cover 11 with the black evaluation value and the white evaluation value calculated by the arithmetic processing unit 202. The cover opening and closing determination unit 203 further outputs a determination result of the determination process. The cover opening and closing determination unit 203 is implemented by the CPU 180 in FIG. 2 executing a program, for example.

Part or all of the acquisition unit 201, the arithmetic processing unit 202, and the cover opening and closing determination unit 203 may be implemented not by a software program but by an integrated circuit such as a field programmable gate array (FPGA) or an application specific integrated circuit (ASIC), for example.

The acquisition unit 201, the arithmetic processing unit 202, and the cover opening and closing determination unit 203 illustrated in FIG. 3 are conceptual functions, and are not limited to the above-described configuration. For example, a plurality of functional units illustrated as independent functional units in the control device 18 of FIG. 3 may be configured as a single functional unit. Further, the function of one of the functional units in the control device 18 of FIG. 3 may be divided into a plurality of functions to form a plurality of functional units.

Figure 4A:
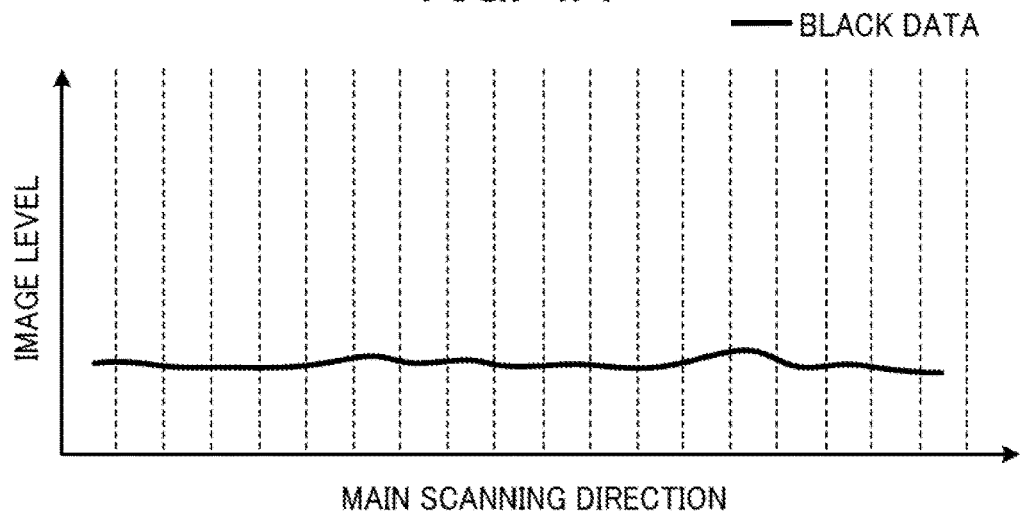
FIGS. 4A and 4B are graphs illustrating an operation of the control device of the first embodiment to calculate a black evaluation value from black data.
Figure 4B:
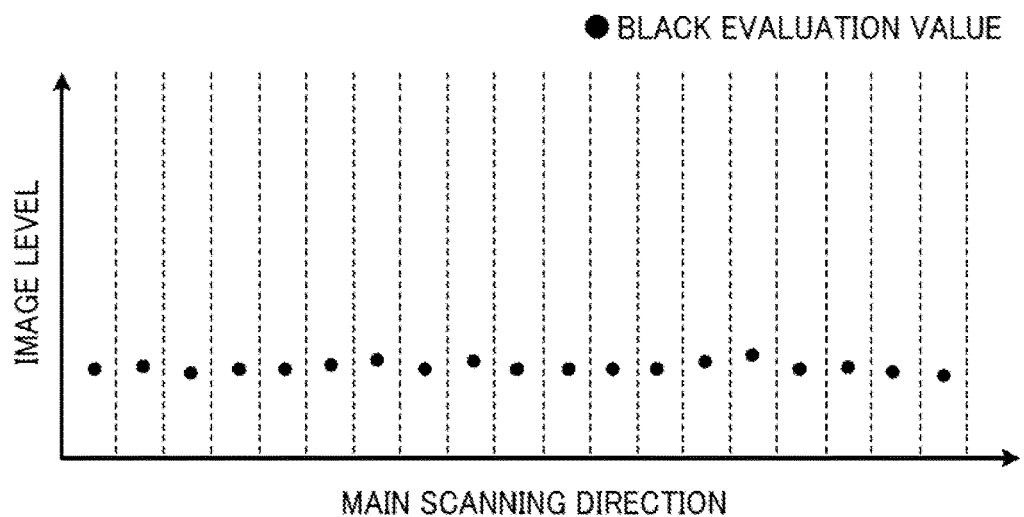
Figure 5:
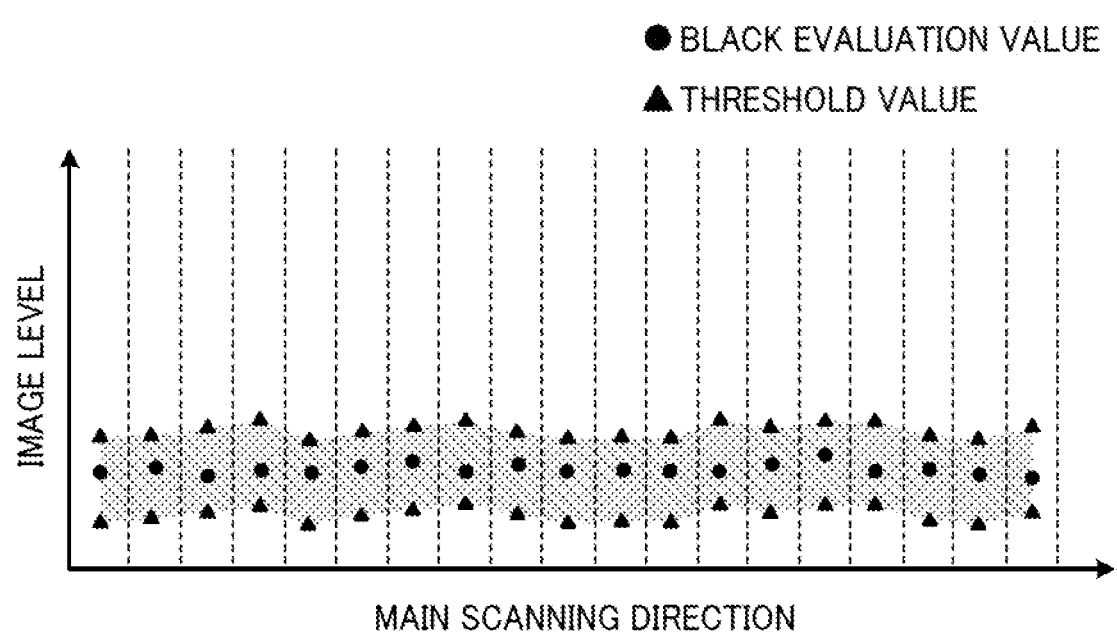
FIG. 5 is a graph illustrating an operation of the control device of the first embodiment to perform threshold determination of the black evaluation value.
Figure 6A:
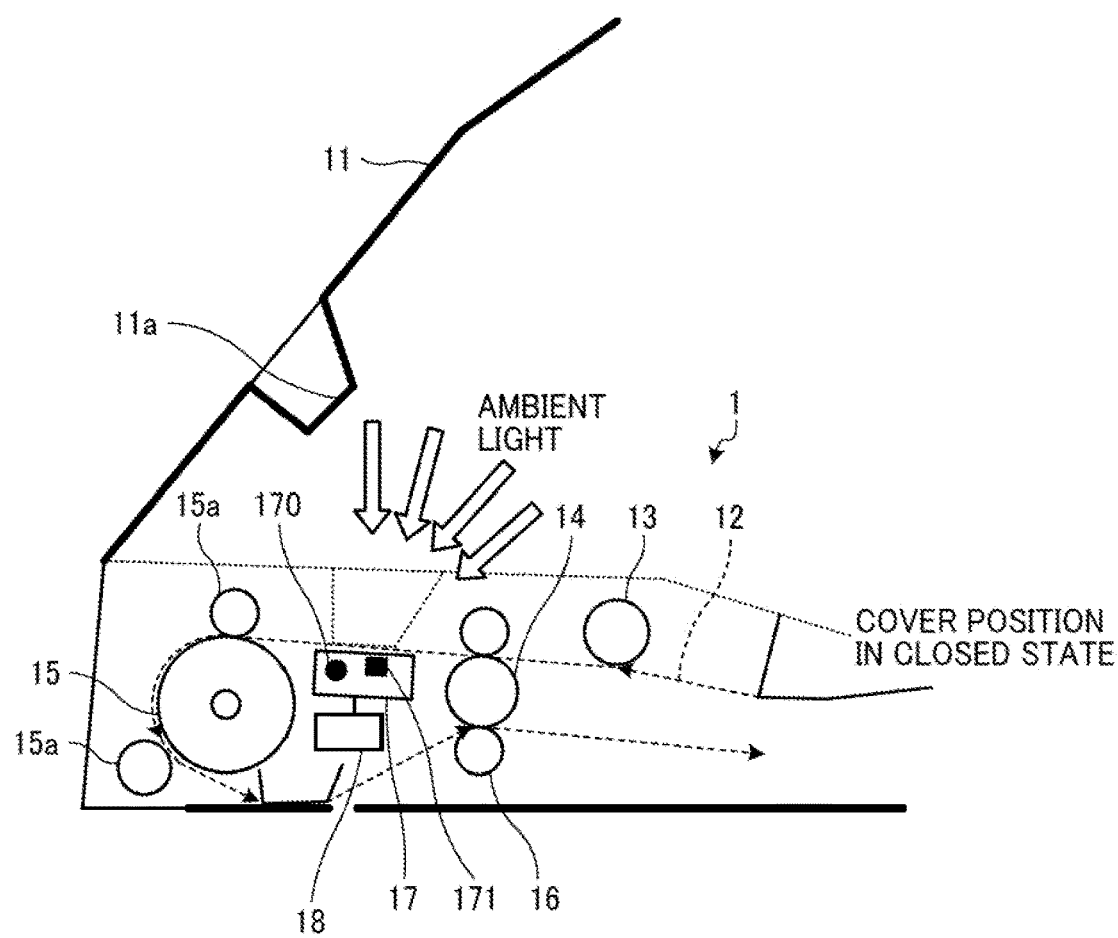
FIGS. 6A and 6B are a diagram and a graph illustrating an example of threshold determination of the black evaluation value when a cover of the image reading apparatus of the first embodiment is wide open.
Figure 6B:
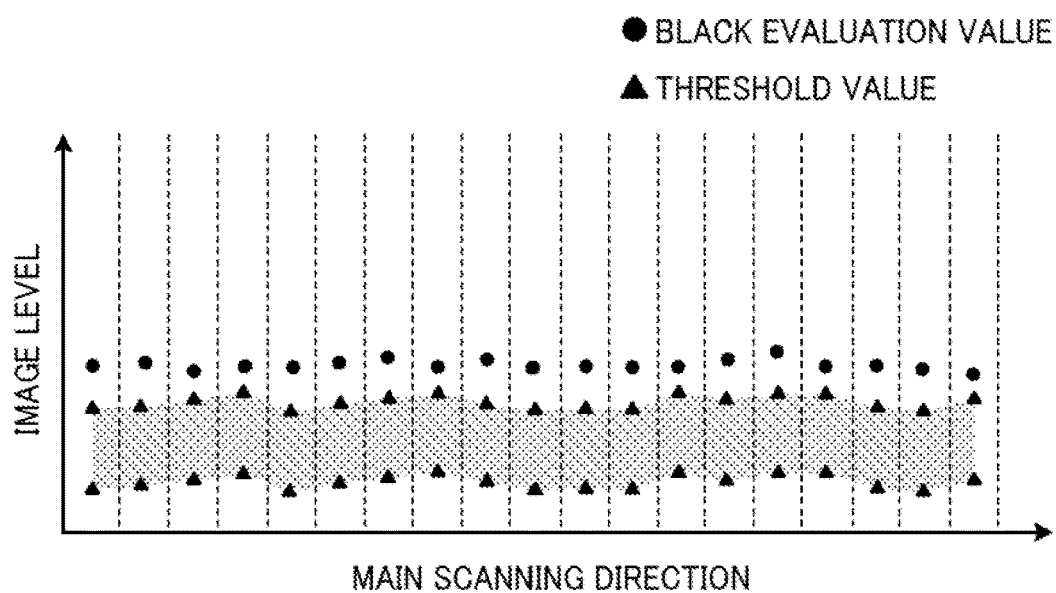
Figure 7A:
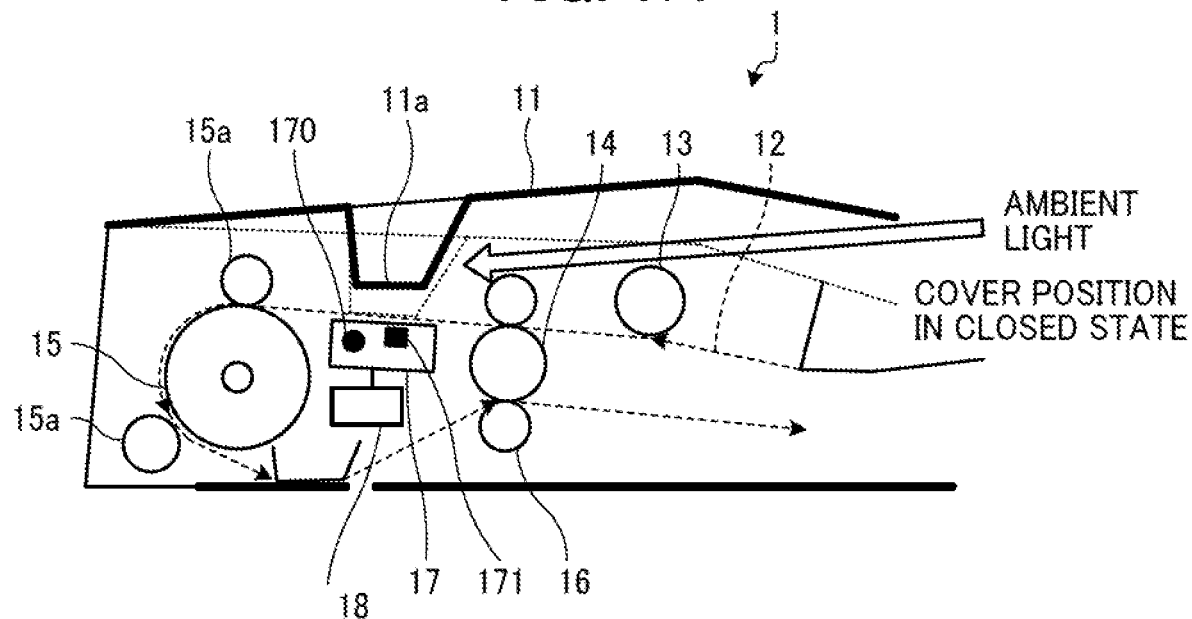
FIGS. 7A and 7B are a diagram and a graph illustrating an example of threshold determination of the black evaluation value when the cover of the image reading apparatus of the first embodiment is half open.
Figure 7B:
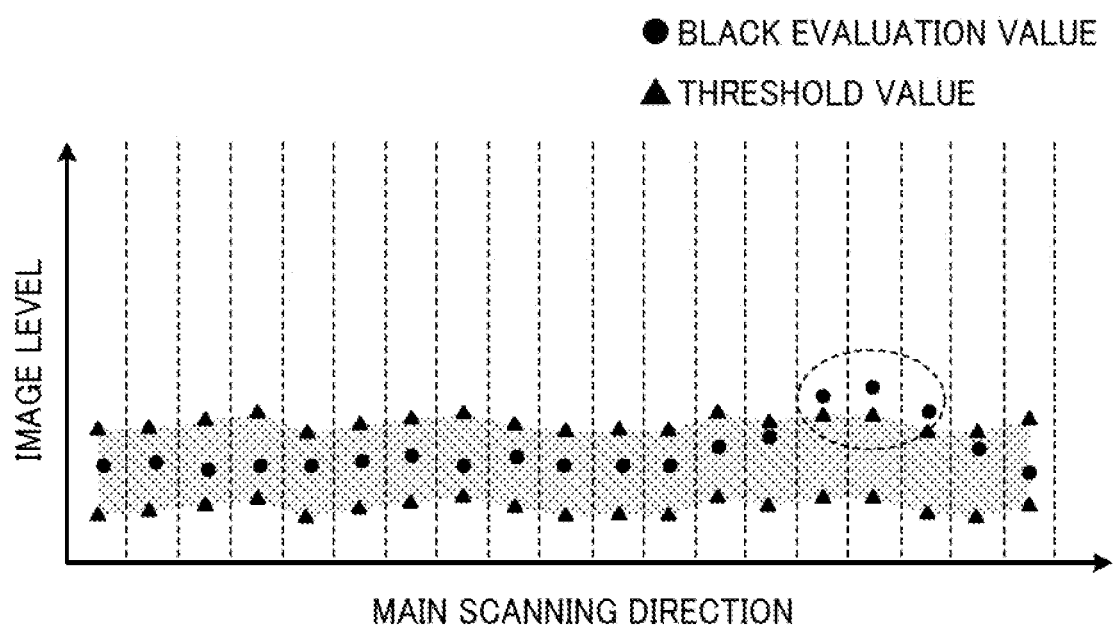
Figure 8A:
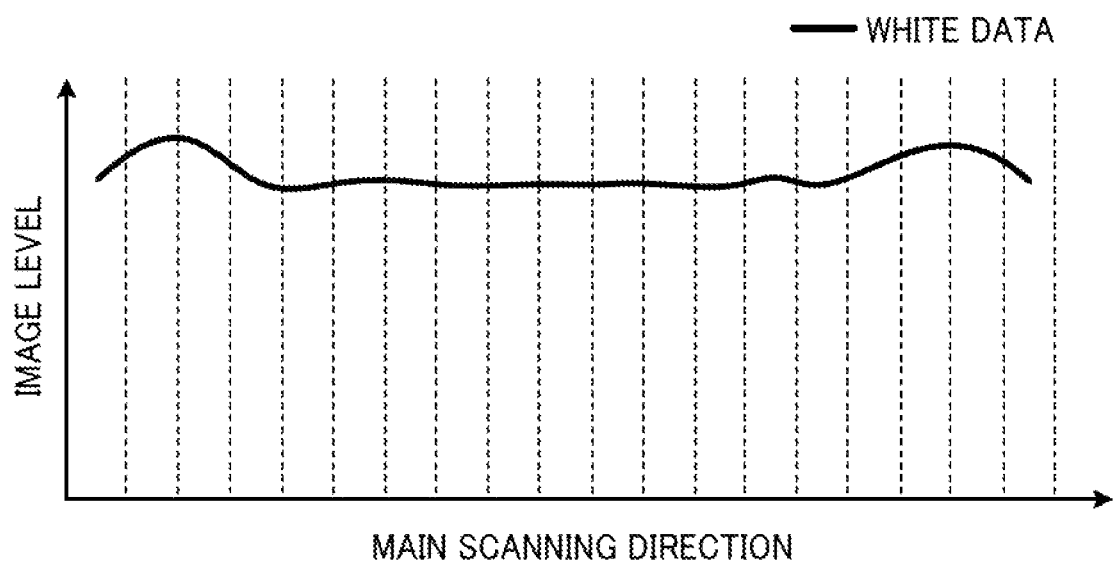
FIGS. 8A and 8B are graphs illustrating an operation of the control device of the first embodiment to calculate a white evaluation value from white data.
Figure 8B:
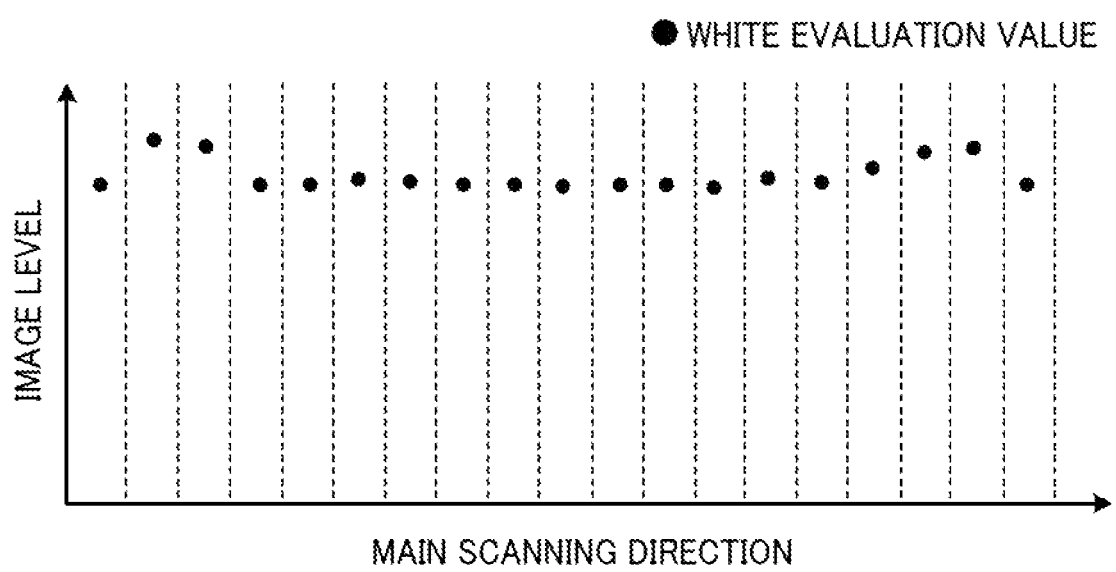
Figure 10A:
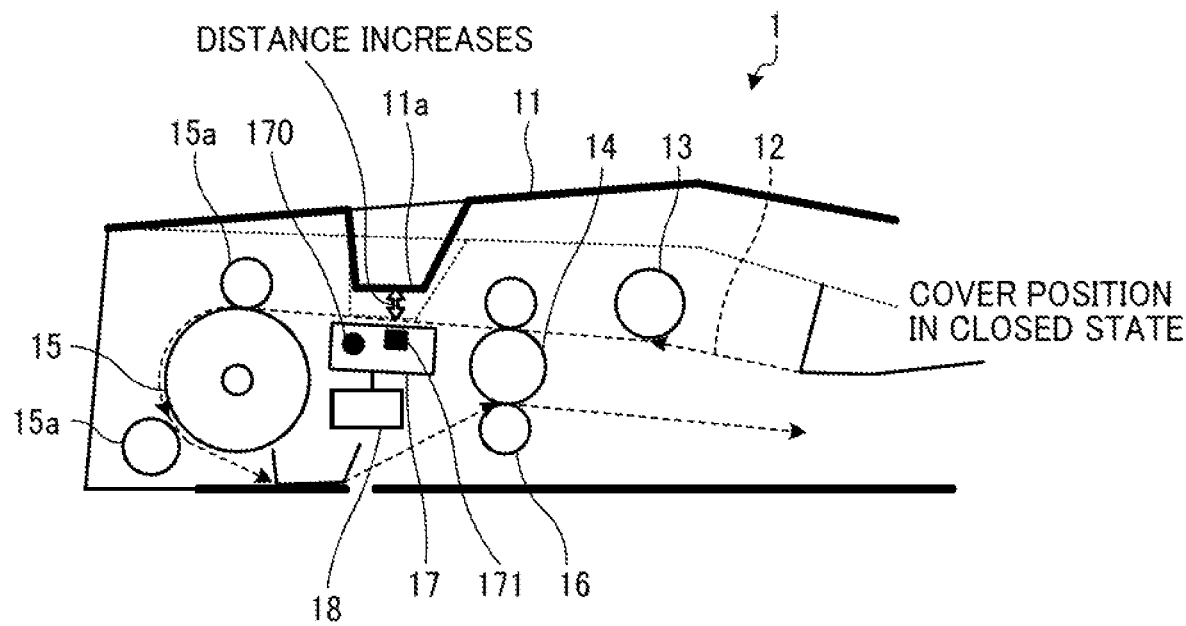
FIGS. 10A and 10B are a diagram and a graph illustrating an example of threshold determination of the white evaluation value when the cover of the image reading apparatus of the first embodiment is somewhat open.
Figure 10B:
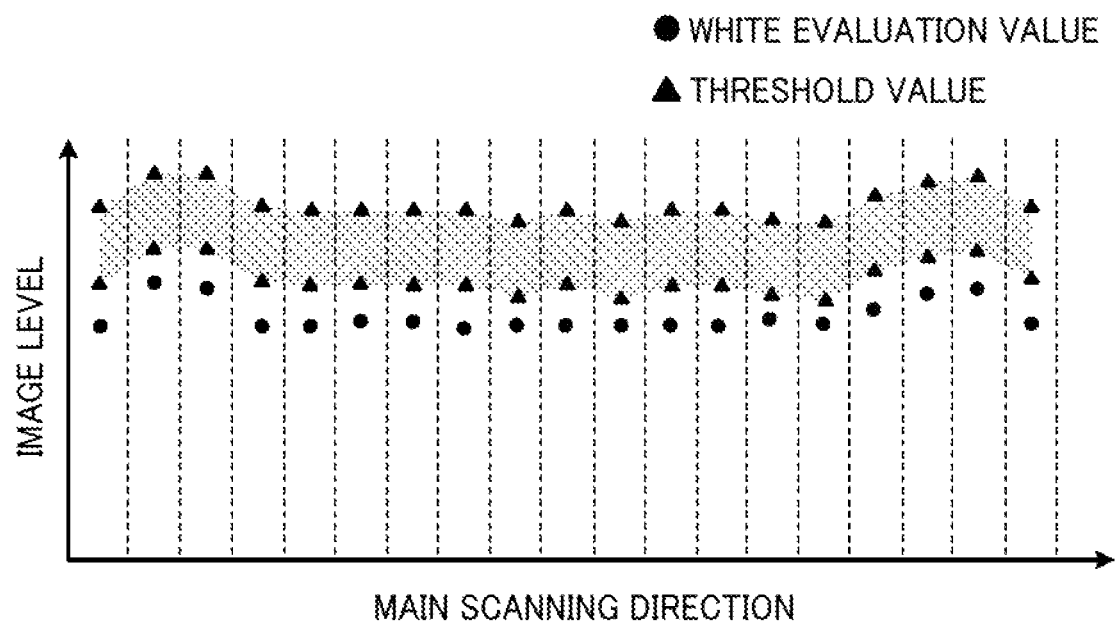
Figure 11A:
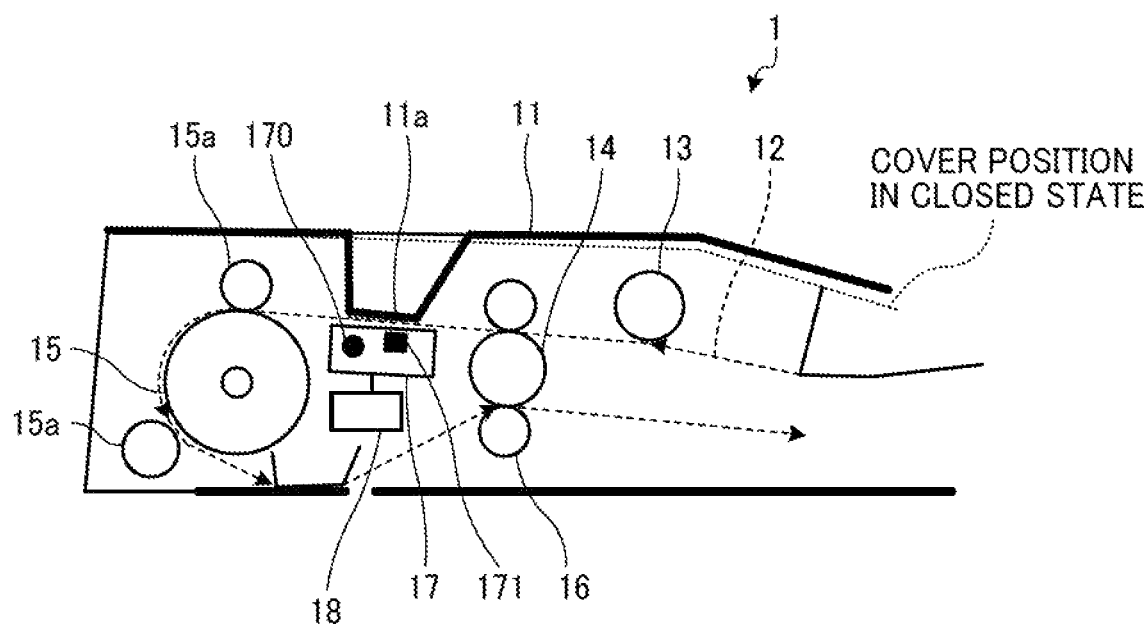
FIGS. 11A and 11B are a diagram and a graph illustrating an example of threshold determination of the white evaluation value when the cover of the image reading apparatus of the first embodiment is slightly open.
Figure 11B:
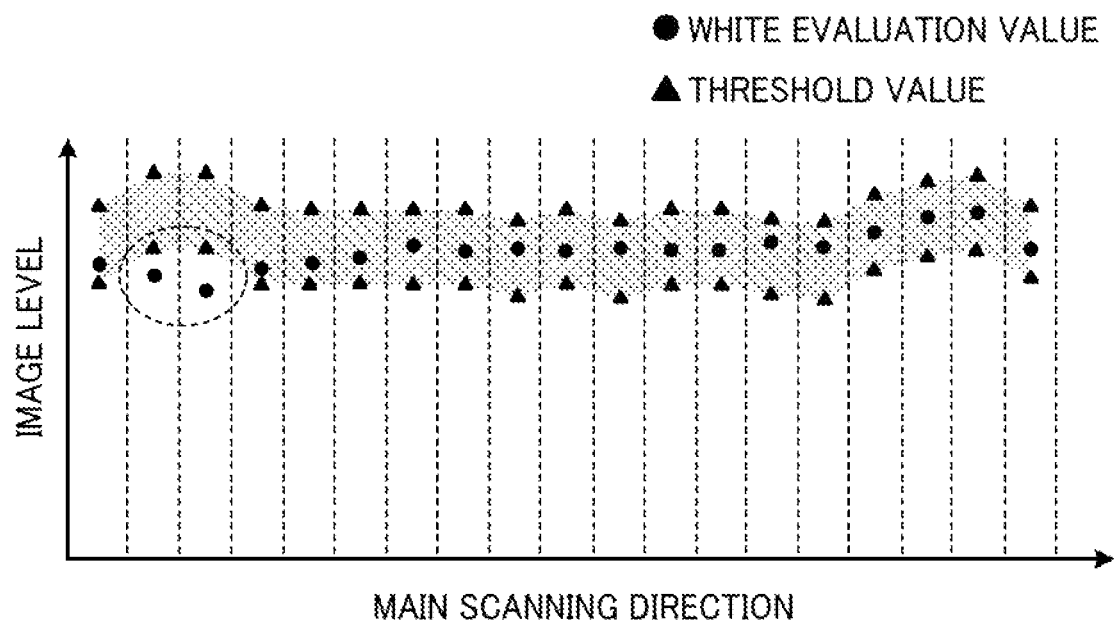

FIGS. 4A and 4B are graphs illustrating an operation of the control device 18 of the first embodiment to calculate the black evaluation value from the black data. FIG. 5 is a graph illustrating an operation of the control device 18 of the first embodiment to perform threshold determination of the black evaluation value. FIGS. 6A and 6B are a diagram and a graph illustrating an example of threshold determination of the black evaluation value when the cover 11 of the image reading apparatus 1 of the first embodiment is wide open. FIGS. 7A and 7B are a diagram and a graph illustrating an example of threshold determination of the black evaluation value when the cover 11 of the image reading apparatus 1 of the first embodiment is half open. FIGS. 8A and 8B are graphs illustrating an operation of the control device 18 of the first embodiment to calculate the white evaluation value from the white data. FIG. 9 is a graph illustrating an operation of the control device 18 of the first embodiment to perform threshold determination of the white evaluation value. FIGS. 10A and 10B are a diagram and a graph illustrating an example of threshold determination of the white evaluation value when the cover 11 of the image reading apparatus 1 of the first embodiment is somewhat open. FIGS. 11A and 11B are a diagram and a graph illustrating an example of threshold determination of the white evaluation value when the cover 11 of the image reading apparatus 1 of the first embodiment is slightly open.

The process of the control device 18 to determine the open state or the closed state of the cover 11 will be described with reference to FIGS. 4A to 11B.

The process of determining the open state or the closed state of the cover 11 with the black data will first be described with reference to FIGS. 4A to 7B.

As illustrated in FIG. 4A, the black data is the image data read by the reading module 17 with the light source 170 turned off before the reading process on the document. In the graph of the black data illustrated in FIG. 4A, the horizontal axis represents the main scanning direction, and the vertical axis represents the image level. Herein, the image level refers to the pixel value or the luminance value of the image data. The arithmetic processing unit 202 divides the black data acquired by the acquisition unit 201 into a plurality of particular sections in the main scanning direction, and calculates the black evaluation value in each of the particular sections, as illustrated in FIG. 4B. The method of calculating the black evaluation value may calculate the peak value, the mean value, or the median value of the black data in each of the particular sections, for example. The peak value, the mean value, or the median value of the black data in each of the particular sections may also be calculated in the sub-scanning direction as well as in the main scanning direction.

The cover opening and closing determination unit 203 then performs the threshold determination of the black evaluation value to determine the open state or the closed state of the cover 11. Specifically, as illustrated in FIG. 5, the maximum value and the minimum value are previously set for each of the particular sections in the main scanning direction each as a threshold value (a first threshold value). The cover opening and closing determination unit 203 then determines whether the black evaluation value is included in the range between the maximum value and the minimum value in each of the particular sections in the main scanning direction. If the black evaluation value is included in the range in all of the particular sections in the main scanning direction, the cover opening and closing determination unit 203 determines that the cover 11 is in the closed state. Herein, the black evaluation value may be previously acquired in the closed state of the cover 11, and each of the maximum value and the minimum value as the threshold value may be set to a particular percentage of the previously acquired black evaluation value. Alternatively, each of the maximum value and the minimum value may be calculated with a change over time or variations taken into account. In the following description, the above-described range between the maximum value and the minimum value will be referred to as the threshold range.

With reference to FIGS. 6A and 6B, a description will be given of the determination process of the cover opening and closing determination unit 203 when the cover 11 is wide open.

As illustrated in FIG. 6A, when the cover 11 is wide open, ambient light is directly incident on the reading module 17, causing an overall increase in the black evaluation value, with the black evaluation value exceeding the threshold range in all of the particular sections in the main scanning direction, as illustrated in FIG. 6B. In this case, the cover opening and closing determination unit 203 determines that the cover 11 is in the open state.

With reference to FIGS. 7A and 7B, a description will be given of the determination process of the cover opening and closing determination unit 203 when the cover 11 is half open.

As illustrated in FIG. 7A, when the cover 11 is half open, part of the ambient light is incident on the reading module 17, increasing the black evaluation value in some of the particular sections in the main scanning direction, as illustrated in FIG. 7B. The black evaluation value exceeds the threshold range in the some of the particular sections in the main scanning direction (see the area encircled by a broken line in FIG. 7B). In this case, too, the cover opening and closing determination unit 203 determines that the cover 11 is in the open state. Depending on the layout of components, however, the reading module 17 may be partially overshadowed and unexposed to the ambient light. In this case, the result illustrated in FIG. 7B may be obtained even when the cover 11 is wide open.

The process of determining the open state or the closed state of the cover 11 with the white data will be described with reference to FIGS. 8A and 11B.

As illustrated in FIG. 8A, the white data is the image data read by the reading module 17 with the light source 170 turned on before the reading process on the document. In the graph of the white data illustrated in FIG. 8A, the horizontal axis represents the main scanning direction, and the vertical axis represents the image level. The arithmetic processing unit 202 divides the white data acquired by the acquisition unit 201 into a plurality of particular sections in the main scanning direction, and calculates the white evaluation value in each of the particular sections in the main scanning direction, as illustrated in FIG. 8B. The method of calculating the white evaluation value may calculate the peak value or the mean value of the white data in each of the particular sections in the main scanning direction, for example. Further, the peak value or the mean value of the white data in each of the particular sections may also be calculated in the sub-scanning direction as well as in the main scanning direction.

The cover opening and closing determination unit 203 then performs the threshold determination of the white evaluation value to determine the open state or the closed state of the cover 11. Specifically, as illustrated in FIG. 9, the maximum value and the minimum value are previously set for each of the particular sections in the main scanning direction each as a threshold value (a second threshold value). The cover opening and closing determination unit 203 then determines whether the white evaluation value is included in the range between the maximum value and the minimum value in each of the particular sections in the main scanning direction. If the white evaluation value is included in the range in all of the particular sections in the main scanning direction, the cover opening and closing determination unit 203 determines that the cover 11 is in the closed state. Herein, the white evaluation value may be previously acquired in the closed state of the cover 11, and each of the maximum value and the minimum value as the threshold value may be set to a particular percentage of the previously acquired white evaluation value. Alternatively, each of the maximum value and the minimum value may be calculated with a change over time or variations taken into account. In the following description, the above-described range between the maximum value and the minimum value will be referred to as the threshold range.

With reference to FIGS. 10A and 10B, a description will be given of the determination process of the cover opening and closing determination unit 203 when the cover 11 is somewhat open.

As illustrated in FIG. 10A, when the cover 11 is somewhat open, there is a certain distance between the reading module 17 and the background plate 11a, with the background plate 11a being out of the focal position of the image reading sensor 171. As illustrated in FIG. 10B, therefore, the white evaluation value is reduced overall, falling below the threshold range in all of the particular sections in the main scanning direction. In this case, the cover opening and closing determination unit 203 determines that the cover 11 is in the open state.

With reference to FIGS. 11A and 11B, a description will be given of the determination process of the cover opening and closing determination unit 203 when the cover 11 is slightly open.

As illustrated in FIG. 11A, when the cover 11 is slightly open, there is a slight distance between the reading module 17 and the background plate 11a, with the background plate 11a being out of the focal position of the image reading sensor 171 in some of the particular sections in the main scanning direction. As illustrated in FIG. 11B, therefore, the white evaluation value is reduced in some of the particular sections in the main scanning direction. The white evaluation value falls below the threshold range in the some of the particular sections in the main scanning direction (see the area encircled by a broken line in FIG. 11B). In this case, too, the cover opening and closing determination unit 203 determines that the cover 11 is in the open state.

As described above, the cover opening and closing determination unit 203 determines the open state or the closed state of the cover 11 based on the black evaluation value calculated by the arithmetic processing unit 202, and determines the open state or the closed state of the cover 11 based on the white evaluation value calculated by the arithmetic processing unit 202. Then, if the open state of the cover 11 is indicated by at least one of the result of determination of the open state or the closed state of the cover 11 based on the black evaluation value or the result of determination of the open state or the closed state of the cover 11 based on the white evaluation value, the cover opening and closing determination unit 203 ultimately determines that the cover 11 is in the open state. If the closed state of the cover 11 is indicated by both the result of determination of the open state or the closed state of the cover 11 based on the black evaluation value and the result of determination of the open state or the closed state of the cover 11 based on the white evaluation value, the cover opening and closing determination unit 203 ultimately determines that the cover 11 is in the closed state.

As described above, in the image reading apparatus 1 of the first embodiment, the cover 11 is openable and closable relative to the particular portion of the transport path 12 for transporting the document. The reading module 17 includes the light source 170 and the image reading sensor 171. The image reading sensor 171 detects the reflected light of the light emitted toward the document from the light source 170, and obtains the read value. The control device 18 controls the operation of the reading module 17. The acquisition unit 201 of the control device 18 acquires, as the black data, the read value in the main scanning direction obtained through the detection by the image reading sensor 171 with the light source 170 turned off. The acquisition unit 201 further acquires, as the white data, the read value in the main scanning direction obtained through the detection by the image reading sensor 171 with the light source 170 turned on. The arithmetic processing unit 202 of the control device 18 calculates the black evaluation value for each of a plurality of locations in the main scanning direction of the black data based on the black data in the plurality of locations in the main scanning direction. The arithmetic processing unit 202 further calculates the white evaluation value for each of a plurality of locations in the main scanning direction based on the white data in the plurality of locations in the main scanning direction. The cover opening and closing determination unit 203 of the control device 18 determines the open state or the closed state of the cover 11 based on the black evaluation value, and determines the open state or the closed state of the cover 11 based on the white evaluation value. When at least one of the determination result based on the black evaluation value or the determination result based on the white evaluation value indicates the open state of the cover 11, the cover opening and closing determination unit 203 determines that the cover 11 is in the open state. When the determination result based on the black evaluation value and the determination result based on the white evaluation value both indicate the closed state of the cover 11, the cover opening and closing determination unit 203 determines that the cover 11 is in the closed state. The open state or the closed state of the cover 11 is ultimately determined with the above-described two types of determinations. Consequently, the open state or the closed state of the cover 11 is determined with improved accuracy without a sensor that detects the open state or the closed state of the cover 11. Accordingly, the open state or the closed state of the cover 11 is accurately determined even when the cover 11 is half open or is a special type of cover exposed to bright ambient light, for example.

A second embodiment of the present invention will be described.

A description will be given of the image reading apparatus 1 of the second embodiment, focusing on differences from the image reading apparatus 1 of the first embodiment. The following description of the second embodiment will be given of an operation of previously storing reference values in a storage unit and calculating threshold values for determining the open state or the closed state of the cover 11 based on the reference values. The general arrangement of the image reading apparatus 1 of the second embodiment and the hardware configuration of a control device 18a and the reading module 17 of the second embodiment are similar to those described in the first embodiment.

Figure 12:
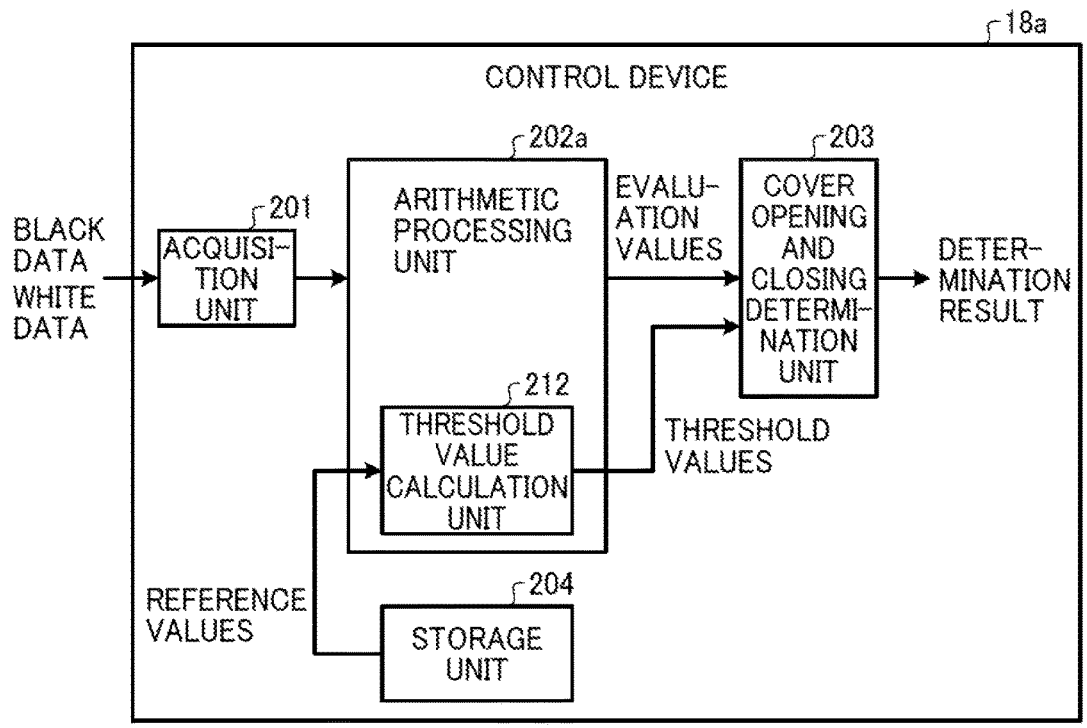
FIG. 12 is a diagram illustrating a configuration example of functional blocks of a control device according to a second embodiment of the present invention.

FIG. 12 is a diagram illustrating a configuration example of functional blocks of the control device 18a according to the second embodiment. A configuration of the functional blocks of the control device 18a according to the second embodiment will be described with reference to FIG. 12.

As illustrated in FIG. 12, the control device 18a includes the acquisition unit 201, an arithmetic processing unit 202a (an example of the first calculation unit), the cover opening and closing determination unit 203, and a storage unit 204. In the second embodiment, the operations of the acquisition unit 201 and the cover opening and closing determination unit 203 are similar to those of the first embodiment described above.

The storage unit 204 is a functional unit that previously stores the reference values for use in the calculation of the threshold values by the arithmetic processing unit 202a. Specifically, the storage unit 204 stores the reference value for calculating the threshold value for use in the threshold determination of the black evaluation value and the reference value for calculating the threshold value for use in the threshold determination of the white evaluation value. Herein, the reference value for the black evaluation value corresponds to a first reference value, and the reference value for the white evaluation value corresponds to a second reference value. The same applies to later-described modified examples. The storage unit 204 is implemented by the memory 181 illustrated in FIG. 2.

The arithmetic processing unit 202a includes a threshold value calculation unit 212 (an example of a second calculation unit).

The threshold value calculation unit 212 reads the reference values from the storage unit 204. Then, based on the reference values, the threshold value calculation unit 212 calculates the threshold values for use in the determination process of the cover opening and closing determination unit 203, i.e., the threshold determination of the white evaluation value. Herein, the threshold value of the black evaluation value corresponds to the first threshold value, and the threshold value of the white evaluation value corresponds to the second threshold value. The same applies to the later-described modified examples. For example, the threshold value calculation unit 212 may calculate each of the threshold values as a particular percentage of the corresponding reference value, or may calculate the threshold value by adding a particular value to the reference value or by subtracting a particular value from the reference value.

The reference values stored in the storage unit 204 may be the black evaluation value and the white evaluation value measured before factory shipment of the image reading apparatus 1, for example. Further, each time the black evaluation value and the white evaluation value are obtained when the closed state of the cover 11 is determined, the black evaluation value and the white evaluation value stored in the storage unit 204 may be rewritten with the thus-obtained black evaluation value and white evaluation value.

The acquisition unit 201, the arithmetic processing unit 202a, and the cover opening and closing determination unit 203 illustrated in FIG. 12 are conceptual functions, and are not limited to the above-described configuration. For example, a plurality of functional units illustrated as independent functional units in the control device 18a of FIG. 12 may be configured as a single functional unit. Further, the function of one of the functional units in the control device 18a of FIG. 12 may be divided into a plurality of functions to form a plurality of functional units.

With the above-described configuration, each execution of the process of determining the open state or the closed state of the cover 11 by the cover opening and closing determination unit 203 takes place under the same conditions, thereby preventing the reading operation from being executed based on the erroneously determined closed state of the cover 11 due to a change over time or anomaly in the light source 170, for example.

As a first modified example of the second embodiment, a description will be given of an operation of previously storing, in the storage unit 204, the reference values unique to the individual image reading apparatus 1 and calculating the threshold values for determining the open state or the closed state of the cover 11 based on the reference values.

Figure 13:
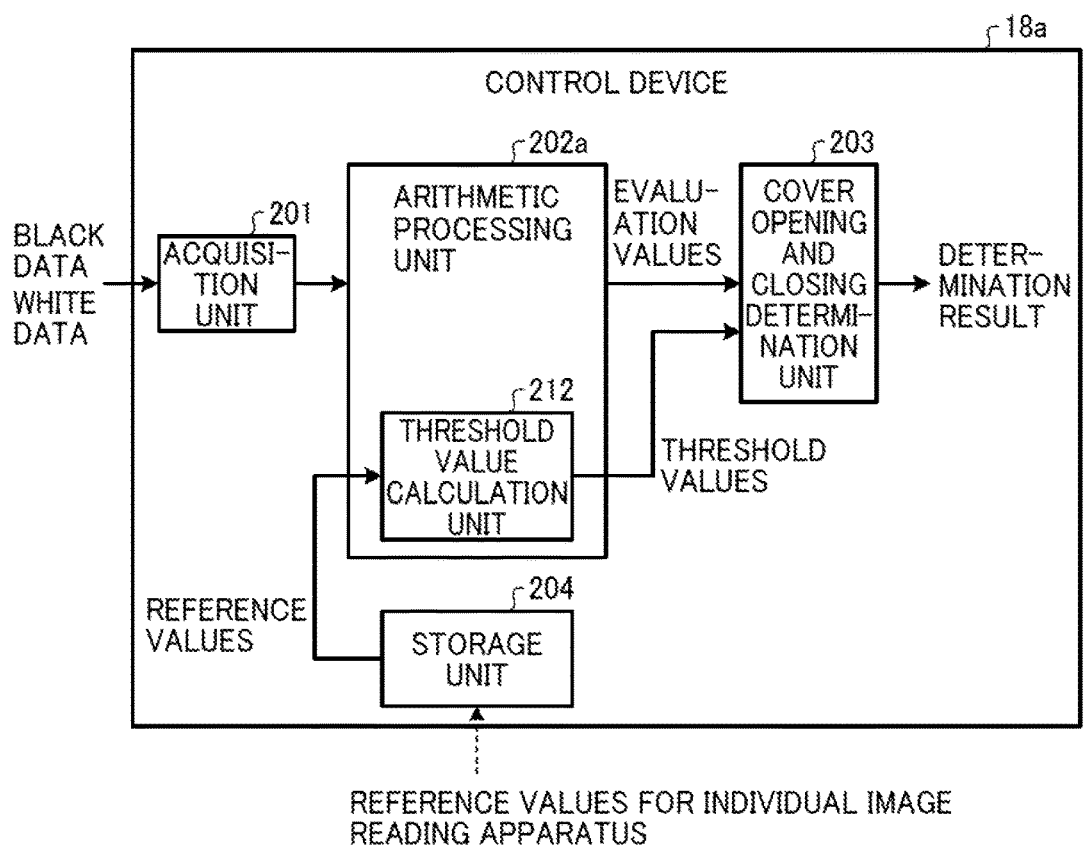
FIG. 13 is a diagram illustrating a configuration example of functional blocks of the control device according to a first modified example of the second embodiment.

FIG. 13 is a diagram illustrating a configuration example of functional blocks of the control device 18a according to the first modified example of the second embodiment. The control device 18a of the first modified example will be described with reference to FIG. 13. In the first modified example, the configuration of the functional blocks of the control device 18a is similar to that illustrated in FIG. 12 described above.

If the reference values stored in the storage unit 204 are fixed values common to a plurality of image reading apparatuses 1, the open state or the closed state of the cover 11 may be erroneously determined in some of the image reading apparatuses 1 owing to variations between the image reading apparatuses 1. In the first modified example, therefore, the reference values unique to the individual image reading apparatus 1 are previously stored in the storage unit 204. The reference values stored in the storage unit 204 for the individual image reading apparatus 1 may be the black evaluation value and the white evaluation value of the image reading apparatus 1 measured before the factory shipment of the image reading apparatus 1, for example.

The above-described configuration reduces erroneous determinations of the open state or the closed state of the cover 11 due to the variations between the image reading apparatuses 1.

As a second modified example of the second embodiment, a description will be given of an operation of calculating, from each of the reference values previously stored in the storage unit 204, a value with the change over time in the characteristics of the light source 170 or the image reading sensor 171 taken into account, and calculating the threshold value for determining the open state or the closed state of the cover 11 based on the thus-calculated value.

Figure 14:
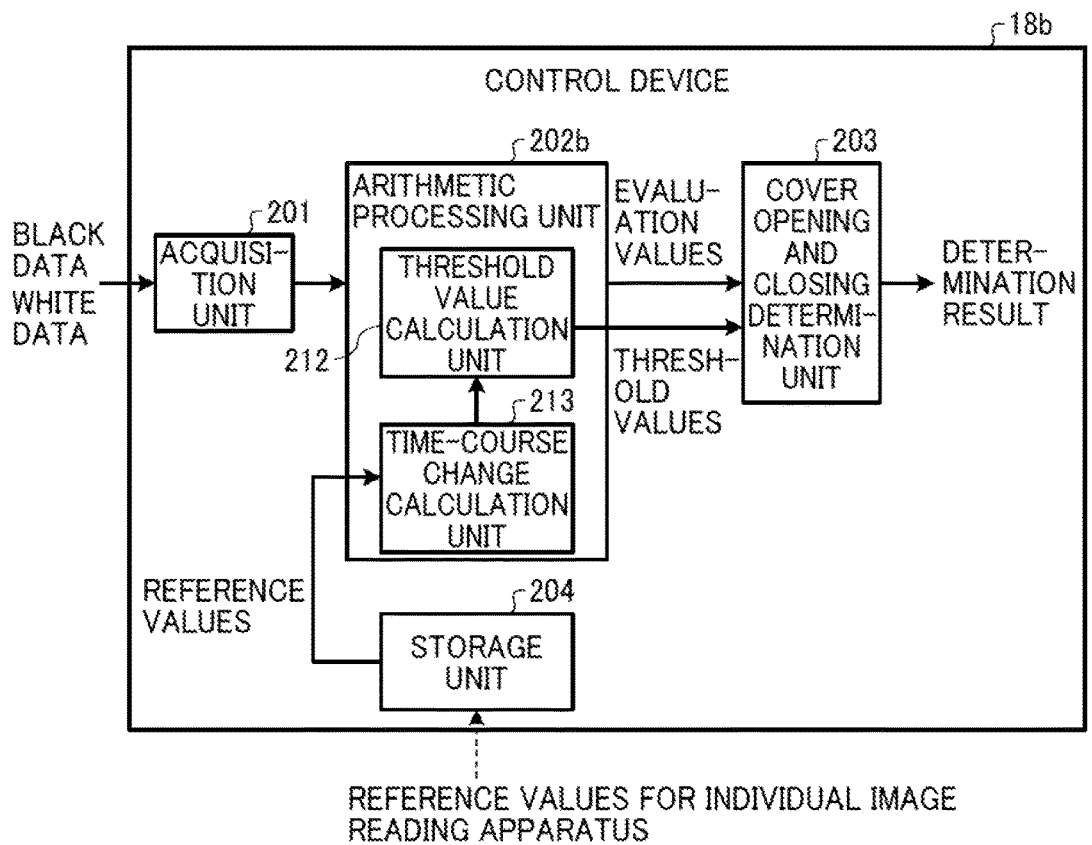
FIG. 14 is a diagram illustrating a configuration example of functional blocks of a control device according to a second modified example of the second embodiment.

FIG. 14 is a diagram illustrating a configuration example of functional blocks of a control device 18b according to the second modified example of the second embodiment. A configuration of the functional blocks of the control device 18b according to the second modified example will be described with reference to FIG. 14.

As illustrated in FIG. 14, the control device 18b includes the acquisition unit 201, an arithmetic processing unit 202b (an example of the first calculation unit), the cover opening and closing determination unit 203 (the determination unit), and the storage unit 204. In the second modified example, the operations of the acquisition unit 201, the cover opening and closing determination unit 203, and the storage unit 204 are similar to those of the first modified example described above.

The arithmetic processing unit 202b includes the threshold value calculation unit 212 (an example of the second calculation unit) and a time-course change calculation unit 213 (a third calculation unit).

If the reference values stored in the storage unit 204 are fixed to obtain fixed threshold values, the open state or the closed state of the cover 11 may be erroneously determined when at least one of the light source 170 or the image reading sensor 171 of the reading module 17 is changed in characteristics owing to a change over time. For example, the light amount of the light source 170 is reduced with time, and the white evaluation value is also reduced accordingly. If the threshold determination is performed with the thus-reduced white evaluation value, the cover 11 in the closed state may be erroneously determined as being in the open state. In the second modified example, therefore, the time-course change calculation unit 213 calculates, from each of the reference values read from the storage unit 204, a value with the change over time in the characteristics of at least one of the light source 170 or the image reading sensor 171 taken into account. That is, the time-course change calculation unit 213 calculates, from the reference value, the value with the change over time of the reading module 17 taken into account. For example, in the case of the light source 170, the time-course change calculation unit 213 may calculate the value with the change over time in the characteristics of the light source 170 taken into account by subtracting the value corresponding to the reduction with time in the light amount from the original reference value for the white evaluation value. Further, the time-course change calculation unit 213 may calculate the value with the change over time in the characteristics of the light source 170 or the image reading sensor 171 taken into account based on the operating time of the light source 170 or the image reading sensor 171 or the active time of the image reading apparatus 1. Then, based on the values calculated by the time-course change calculation unit 213, the threshold value calculation unit 212 calculates the threshold values for use in the determination process of the cover opening and closing determination unit 203, i.e., the threshold determination of the black evaluation value and the white evaluation value.

The acquisition unit 201, the arithmetic processing unit 202b, the cover opening and closing determination unit 203, and the storage unit 204 illustrated in FIG. 14 are conceptual functions, and are not limited to the above-described configuration. For example, a plurality of functional units illustrated as independent functional units in the control device 18b of FIG. 14 may be configured as a single functional unit. Further, the function of one of the functional units in the control device 18b of FIG. 14 may be divided into a plurality of functions to form a plurality of functional units.

With the above-described configuration, the open state or the closed state of the cover 11 is determined with the change over time in the characteristics of at least one of the light source 170 or the image reading sensor 171 taken into account, thereby reducing the erroneous determinations of the open state or the closed state of the cover 11.

As a third modified example of the second embodiment, a description will be given of an operation of updating the reference values stored in the storage unit 204 with new reference values, which are the black evaluation value and the white evaluation value obtained when the closed state of the cover 11 is determined through the determination process of the cover opening and closing determination unit 203 to determine the open state or the closed state of the cover 11.

Figure 15:
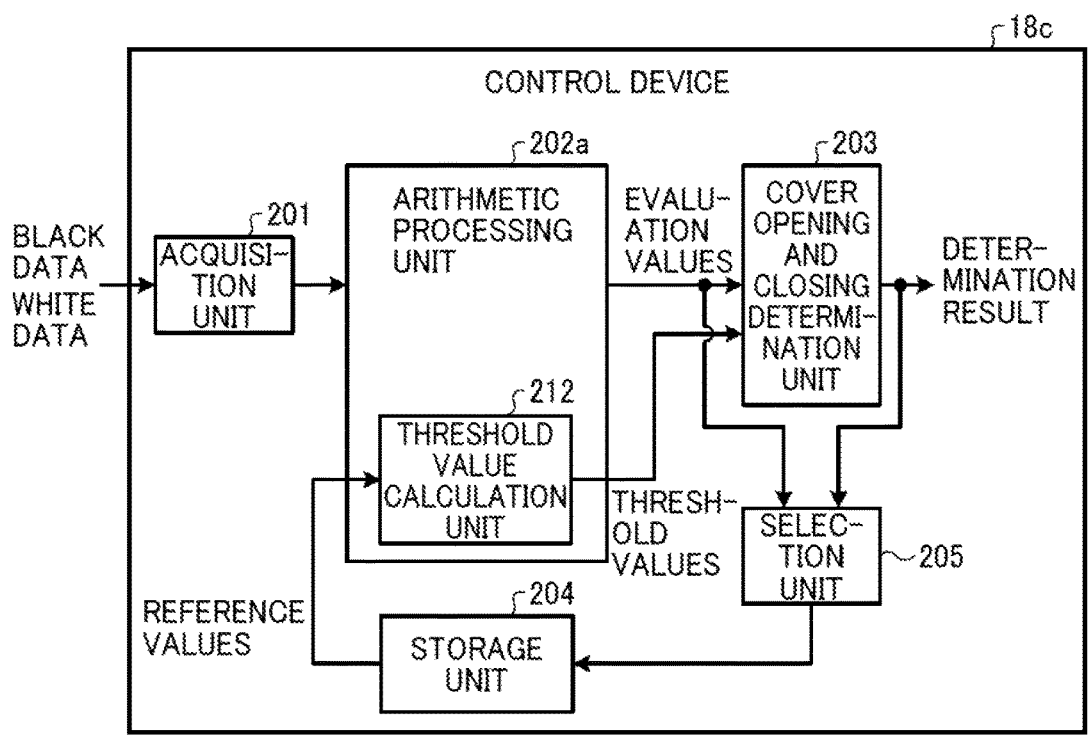
FIG. 15 is a diagram illustrating a configuration example of functional blocks of a control device according to a third modified example of the second embodiment.

FIG. 15 is a diagram illustrating a configuration example of functional blocks of a control device 18c according to the third modified example of the second embodiment. A configuration of the functional blocks of the control device 18c according to the third modified example will be described with reference to FIG. 15.

As illustrated in FIG. 15, the control device 18c includes the acquisition unit 201, the arithmetic processing unit 202a (an example of the first calculation unit), the cover opening and closing determination unit 203 (the determination unit), the storage unit 204, and a selection unit 205 (an updating unit). In the third modified example, the operations of the acquisition unit 201, the arithmetic processing unit 202a, and the cover opening and closing determination unit 203 are similar to those of the control device 18a in the second embodiment described above.

The selection unit 205 is a functional unit that updates the reference values stored in the storage unit 204 with new reference values. The selection unit 205 acquires the black evaluation value and the white evaluation value calculated by the arithmetic processing unit 202a and the result of determination by the cover opening and closing determination unit 203. If the result of determination indicates the closed state of the cover 11, the selection unit 205 updates the stored reference values with the acquired black evaluation value and white evaluation value as the new reference values.

The acquisition unit 201, the arithmetic processing unit 202a, the cover opening and closing determination unit 203, the storage unit 204, and the selection unit 205 illustrated in FIG. 15 are conceptual functions, and are not limited to the above-described configuration. For example, a plurality of functional units illustrated as independent functional units in the control device 18c of FIG. 15 may be configured as a single functional unit. Further, the function of one of the functional units in the control device 18c of FIG. 15 may be divided into a plurality of functions to form a plurality of functional units.

The above-described configuration uses, as the reference values, the latest black evaluation value and white evaluation value obtained when the closed state of the cover 11 of the image reading apparatus 1 is determined, thereby reducing the erroneous determinations of the open state or the closed state of the cover 11 due to the change over time of a component of the image reading apparatus 1 or the variations between the image reading apparatuses 1.

A third embodiment of the present invention will be described.

A description will be given of the image reading apparatus 1 of the third embodiment, focusing on differences from the image reading apparatus 1 of the first embodiment. The following description of the third embodiment will be given of an operation of calculating, as the black evaluation value, the mean value of the black data in each of a particular sections in the main scanning direction and the sub-scanning direction, and calculating, as the white evaluation value, the mean value of the white data in each of a particular sections in the main scanning direction and the sub-scanning direction. The general arrangement of the image reading apparatus 1 of the third embodiment and the hardware configuration of a control device 18d and the reading module 17 of the third embodiment are similar to those described in the first embodiment.

Figure 16:
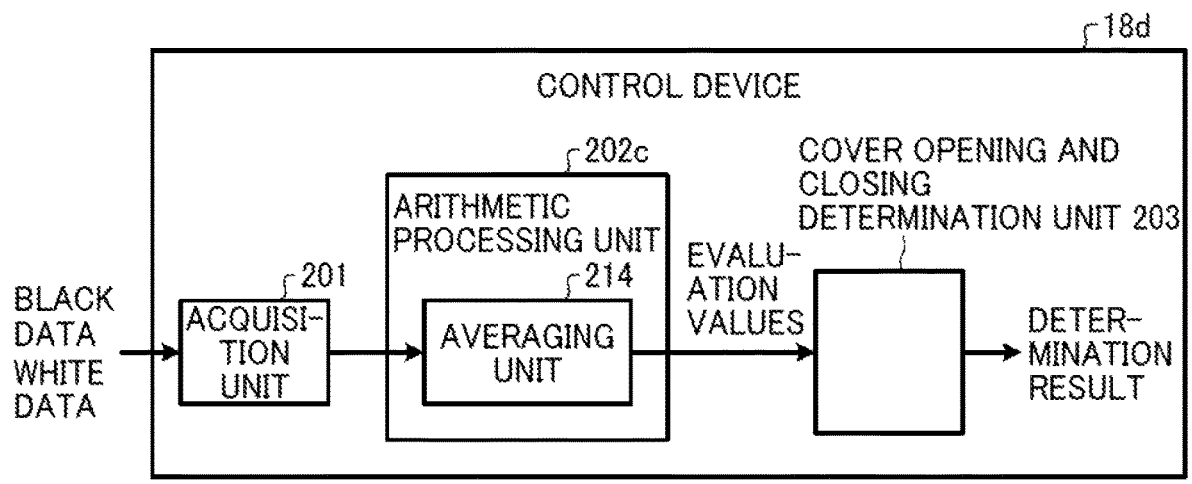
FIG. 16 is a diagram illustrating a configuration example of functional blocks of a control device according to a third embodiment of the present invention.

FIG. 16 is a diagram illustrating a configuration example of functional blocks of the control device 18d according to the third embodiment. A configuration of the functional blocks of the control device 18d according to the third embodiment will be described with reference to FIG. 16.

As illustrated in FIG. 16, the control device 18d includes the acquisition unit 201, an arithmetic processing unit 202c (an example of the first calculation unit), and the cover opening and closing determination unit 203 (the determination unit). In the third embodiment, the operation of the cover opening and closing determination unit 203 is similar to that of the first embodiment described above.

The acquisition unit 201 acquires the black data and the white data in the main scanning direction and the sub-scanning direction from the reading module 17 via the OF circuit 182.

The arithmetic processing unit 202c includes an averaging unit 214.

The averaging unit 214 performs an averaging process of averaging the black data acquired from the acquisition unit 201 in the main scanning direction and the sub-scanning direction for each of the particular sections to calculate the black evaluation value, and averaging the white data acquired from the acquisition unit 201 in the main scanning direction and the sub-scanning direction for each of the particular sections to calculate the white evaluation value. Herein, the particular sections may be the same as the particular sections divided by the arithmetic processing unit 202 in the first embodiment described above. Alternatively, the averaging unit 214 may average the black data acquired from the acquisition unit 201 at least in the main scanning direction for each of the particular sections to calculate the black evaluation value, and may average the white data acquired from the acquisition unit 201 at least in the main scanning direction for each of the particular sections to calculate the white evaluation value.

The acquisition unit 201, the arithmetic processing unit 202c, and the cover opening and closing determination unit 203 illustrated in FIG. 16 are conceptual functions, and are not limited to the above-described configuration. For example, a plurality of functional units illustrated as independent functional units in the control device 18d of FIG. 16 may be configured as a single functional unit. Further, the function of one of the functional units in the control device 18d of FIG. 16 may be divided into a plurality of functions to form a plurality of functional units.

As described above, the black evaluation value and the white evaluation value obtained through the process of averaging the black data and the white data are used in the determination process, thereby preventing a reduction or increase in the image level in some of the particular sections due to noise or dust, for example. Consequently, the erroneous determinations are reduced in the process of determining the open state or the closed state of the cover 11.

A fourth embodiment of the present invention will be described.

A description will be given of the image reading apparatus 1 of the fourth embodiment, focusing on differences from the image reading apparatus 1 of the first embodiment. The following description of the fourth embodiment will be given of an operation of selecting the peak value in each of a particular sections in the main scanning direction of the black data as the black evaluation value, and selecting the peak value in each of a particular sections in the main scanning direction of the white data as the white evaluation value. The general arrangement of the image reading apparatus 1 of the fourth embodiment and the hardware configuration of a control device 18e and the reading module 17 of the fourth embodiment are similar to those described in the first embodiment.

Figure 17:
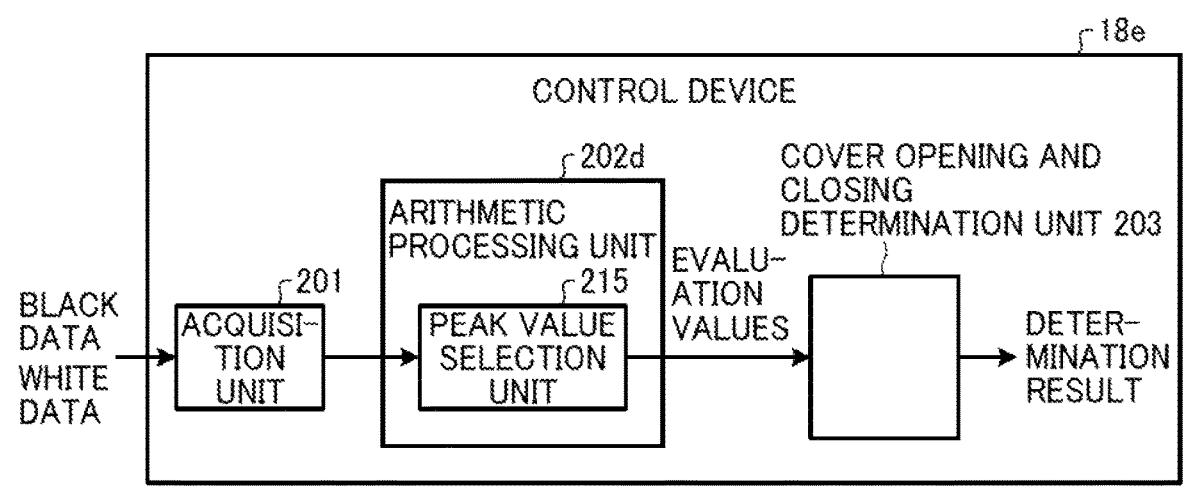
FIG. 17 is a diagram illustrating a configuration example of functional blocks of a control device according to a fourth embodiment of the present invention.

FIG. 17 is a diagram illustrating a configuration example of functional blocks of the control device 18e according to the fourth embodiment. A configuration of the functional blocks of the control device 18e according to the fourth embodiment will be described with reference to FIG. 17.

As illustrated in FIG. 17, the control device 18e includes the acquisition unit 201, an arithmetic processing unit 202d (an example of the first calculation unit), and the cover opening and closing determination unit 203 (the determination unit). In the fourth embodiment, the operations of the acquisition unit 201 and the cover opening and closing determination unit 203 are similar to those of the first embodiment described above.

The arithmetic processing unit 202d includes a peak value selection unit 215.

The peak value selection unit 215 performs a process of calculating, as the black evaluation value, the peak value in each of the particular sections in the main scanning direction of the black data acquired from the acquisition unit 201 and calculating, as the white evaluation value, the peak value in each of the particular sections in the main scanning direction of the white data acquired from the acquisition unit 201. Herein, the particular sections may be the same as the particular sections divided by the arithmetic processing unit 202 in the first embodiment described above.

The acquisition unit 201, the arithmetic processing unit 202d, and the cover opening and closing determination unit 203 illustrated in FIG. 17 are conceptual functions, and are not limited to the above-described configuration. For example, a plurality of functional units illustrated as independent functional units in the control device 18e of FIG. 17 may be configured as a single functional unit. Further, the function of one of the functional units in the control device 18e of FIG. 17 may be divided into a plurality of functions to form a plurality of functional units.

As described above, the peak value in each of the particular sections in the main scanning direction of the black data and the peak value in each of the particular sections in the main scanning direction of the white data are used as the black evaluation value and the white evaluation value, respectively, in the determination process. Therefore, the processing time of the averaging process in the third embodiment is unnecessary, thereby reducing the processing time of the control device 18e.

A fifth embodiment of the present invention will be described.

A description will be given of the image reading apparatus 1 of the fifth embodiment, focusing on differences from the image reading apparatus 1 of the first embodiment. The following description of the fifth embodiment will be given of an operation of distinguishing the open state of the cover 11 from the anomaly in the light source 170, for example. The general arrangement of the image reading apparatus 1 of the fifth embodiment and the hardware configuration of the control device 18 and the reading module 17 of the fifth embodiment are similar to those described in the first embodiment.

Figure 18:
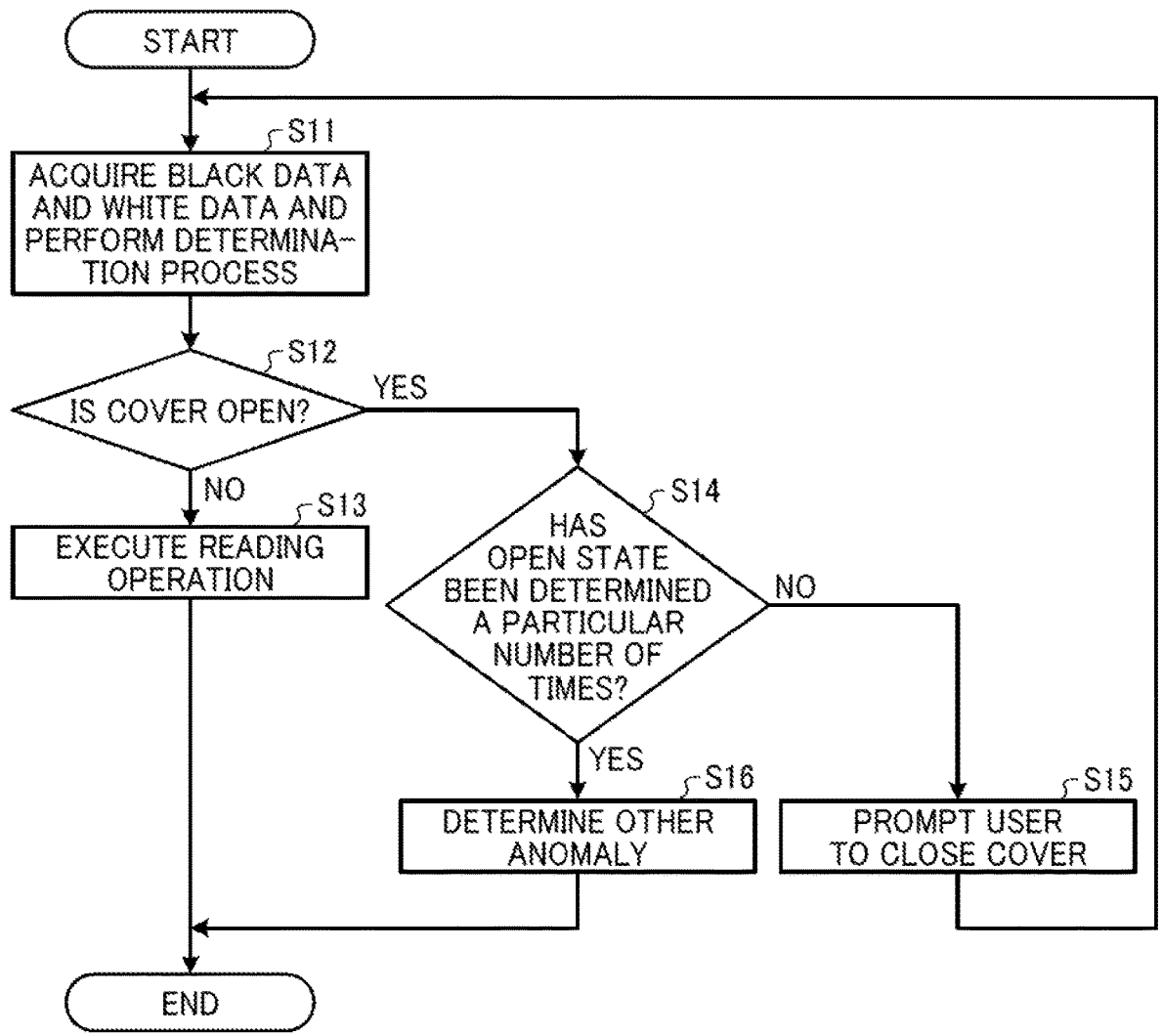
FIG. 18 is a flowchart illustrating an exemplary procedure of an operation of the image reading apparatus according to a fifth embodiment of the present invention to distinguish the open state of the cover from other anomaly.

FIG. 18 is a flowchart illustrating an exemplary procedure of the operation of the image reading apparatus 1 according to the fifth embodiment to distinguish the open state of the cover 11 from other anomaly. With reference to FIG. 18, a description will be given of the operation of the image reading apparatus 1 according to the fifth embodiment to distinguish the open state of the cover 11 from the anomaly in the light source 170, for example (hereinafter referred to as the distinguishing operation).

At step S11, the acquisition unit 201 of the control device 18 acquires the black data and the white data from the reading module 17 via the OF circuit 182. Then, the arithmetic processing unit 202 of the control device 18 calculates, from the black data and the white data acquired by the acquisition unit 201, the black evaluation value and the white evaluation value, respectively, for use in the process of determining the open state or the closed state of the cover 11. Then, with the black evaluation value and the white evaluation value calculated by the arithmetic processing unit 202, the cover opening and closing determination unit 203 of the control device 18 performs the process of determining the open state or the closed state of the cover 11. Then, the operation proceeds to step S12.

If the open state of the cover 11 is determined by the determination process of the cover opening and closing determination unit 203 (YES at step S12), the operation proceeds to step S14. If the closed state of the cover 11 is determined by the determination process of the cover opening and closing determination unit 203 (NO at step S12), the operation proceeds to step S13.

At step S13, the image reading apparatus 1 feeds a document set thereon and executes the reading operation on the document with the reading module 17. The image reading apparatus 1 then completes the distinguishing operation.

At step S14, the control device 18 determines whether the open state of the cover 11 has been determined by the cover opening and closing determination unit 203 a particular number of times. If it is determined that the open state of the cover 11 has been determined the particular number of times (YES at step S14), the operation proceeds to step S16. If it is determined that the open state of the cover 11 has not been determined the particular number of times (NO at step S14), the operation proceeds to step S15.

At step S15, the control device 18 performs notification to prompt a user of the image reading apparatus 1 to close the cover 11. The notification may be causing a display of the image reading apparatus 1 to display a message for prompting the user to close the cover 11 or causing a speaker of the image reading apparatus 1 to output sound for prompting the user to close the cover 11, for example. Then, the operation returns to step S11. In this case, the operation may return to step S11 after the notification of the control device 18 is lifted by a user operation.

At step S16, with the open state of the cover 11 having been determined the particular number of times, the cover opening and closing determination unit 203 determines that at least one of the black evaluation value or the white evaluation value is outside the threshold range even when the cover 11 is closed. The cover opening and closing determination unit 203 therefore determines the other anomaly such as the anomaly in the light source 170. The anomaly may be an anomalous reduction in the light amount caused by the failure of part or all of the light source 170 in the reading module 17, or may be the anomaly in the reading module 17 such as an anomalous detection value (i.e., output value) due to the failure of part or all of the image reading sensor 171, for example. In this case, the control device 18 notifies the user of the anomaly. The notification may be performed with any of the above-described methods. The distinguishing operation of the image reading apparatus 1 is then completed.

With the above-described distinguishing operation of the image reading apparatus 1, the open state of the cover 11 is distinguished from the other anomaly.

A sixth embodiment of the present embodiment will be described.

A description will be given of the image reading apparatus 1 of the sixth embodiment, focusing on differences from the image reading apparatus 1 of the first embodiment. The following description of the sixth embodiment will be given of an operation in which image data for use in black adjustment and black correction and image data for use in white adjustment and white correction are utilized as the black data and the white data, respectively. The general arrangement of the image reading apparatus 1 of the sixth embodiment and the hardware configuration of the control device 18 and the reading module 17 of the sixth embodiment are similar to those described in the first embodiment.

Figure 19:
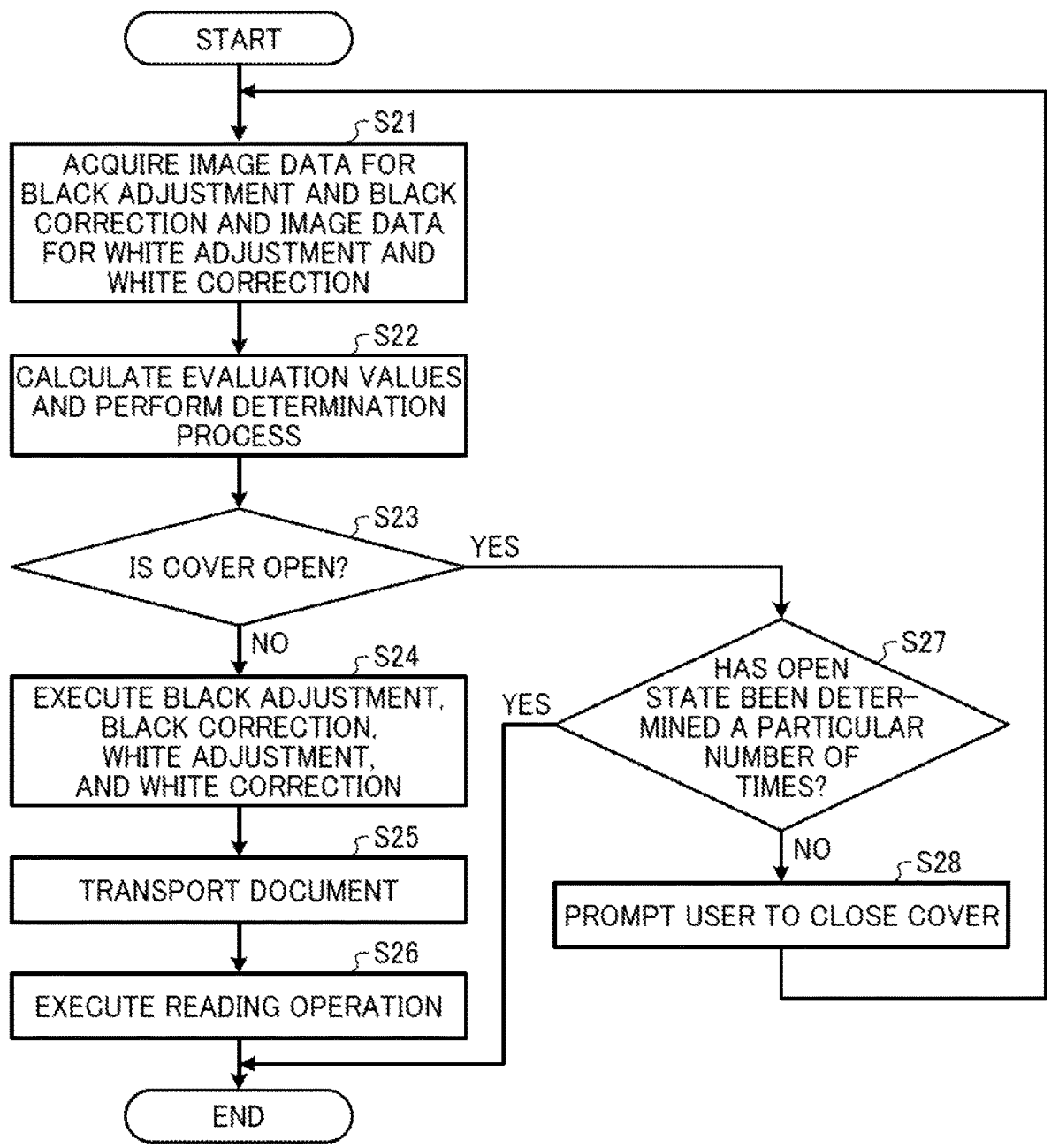
FIG. 19 is a flowchart illustrating an exemplary procedure of an operation of the image reading apparatus according to a sixth embodiment of the present invention to utilize image data for other processes as the black data and the white data.

FIG. 19 is a flowchart illustrating an exemplary procedure of the operation of the image reading apparatus 1 according to the sixth embodiment to utilize the image data for use in the black adjustment and the black correction and the image data for use in the white adjustment and the white correction as the black data and the white data, respectively. With reference to FIG. 19, a description will be given of the operation in which the image data for use in the black adjustment and the black correction and the image data for use in the white adjustment and the white correction are utilized as the black data and the white data, respectively.

With the image data read by the image reading sensor 171 with the cover 11 closed and the light source 170 turned off, the image reading apparatus 1 executes the black adjustment process of adjusting the image data such that the image level with noise taken into account does not fall to or below 0 least significant bit (LSB) when there is no input light amount. The increase in the image level of the image data reduces the dynamic range, preventing the effective use of the bit number. With the above-described image data, therefore, the image reading apparatus 1 further executes the black correction process of correcting the image data to have an appropriate value by performing a subtraction process on output data when there is no light amount.

With the image data of the background plate 11a read by the image reading sensor 171 with the cover 11 closed and the light source 170 turned on, the image reading apparatus 1 further executes the white adjustment process of adjusting the image data to maximize the dynamic range without the image level overflowing despite fluctuations in the light amount. Data uniform in the main scanning direction is not necessarily obtained by reading a document uniform in density. With the above-described image data of the background plate 11a as a reference white plate uniform in density, therefore, the image reading apparatus 1 further performs the white correction process of correcting the image data to uniformly output an image uniform in density.

If the black data and the white data for use in the process of the cover opening and closing determination unit 203 to determine the open state or the closed state of the cover 11 are acquired separately from the image data for use in the black adjustment process, the black correction process, the white adjustment process, and the white correction process described above, the processing time of the entire reading operation of the image reading apparatus 1 is increased, substantially affecting the productivity. The image reading apparatus 1 of the sixth embodiment therefore utilizes the image data acquired for the black adjustment process and the black correction process and the image data acquired for the white adjustment process and the white correction process as the black data and the white data, respectively.

The operation of utilizing the above-described image data as the black data and the white data will be described with reference to FIG. 19.

At step S21, the acquisition unit 201 of the control device 18 acquires the image data for use in the black adjustment process and the black correction process and the image data for use in the white adjustment process and the white correction process from the reading module 17 via the I/F circuit 182. Then, the operation proceeds to step S22.

At step S22, the arithmetic processing unit 202 of the control device 18 calculates the black evaluation value for use in the process of determining the open state or the closed state of the cover 11 by utilizing, as the black data, the image data acquired by the acquisition unit 201 for use in the black adjustment process and the black correction process. The arithmetic processing unit 202 further calculates the white evaluation value for use in the process of determining the open state or the closed state of the cover 11 by utilizing, as the white data, the image data acquired by the acquisition unit 201 for use in the white adjustment process and the white correction process. Then, the cover opening and closing determination unit 203 of the control device 18 performs the process of determining the open state or the closed state of the cover 11 with the black evaluation value and the white evaluation value calculated by the arithmetic processing unit 202. Then, the operation proceeds to step S23.

If the open state of the cover 11 is determined by the determination process of the cover opening and closing determination unit 203 (YES at step S23), the operation proceeds to step S27. If the closed state of the cover 11 is determined by the determination process of the cover opening and closing determination unit 203 (NO at step S23), the operation proceeds to step S24.

At step S24, the control device 18 executes the black adjustment process and the black correction process with the image data acquired by the acquisition unit 201 for use in the black adjustment process and the black correction process. The control device 18 further executes the white adjustment process and the white correction process with the image data acquired by the acquisition unit 201 for use in the white adjustment process and the white correction process. Then, the operation proceeds to step S25.

At step S25, the image reading apparatus 1 feeds a document set thereon and transports the document to the reading position of the reading module 17. Then, the operation proceeds to step S26.

At step S26, the image reading apparatus 1 executes the reading operation on the document with the reading module 17. Then, the operation of the image reading apparatus 1 is completed.

At step S27, the control device 18 determines whether the open state of the cover 11 has been determined by the cover opening and closing determination unit 203 a particular number of times. If it is determined that the open state of the cover 11 has been determined the particular number of times (YES at step S27), the operation of the image reading apparatus 1 is completed. If it is determined that the open state of the cover 11 has not been determined the particular number of times (NO at step S27), the operation proceeds to step S28. When it is determined that the open state of the cover 11 has been determined the particular number of times (YES at step S27), the cover opening and closing determination unit 203 may determine that at least one of the black evaluation value or the white evaluation value is outside the threshold range even when the cover 11 is closed, and thus may determine other anomaly such as anomaly in the light source 170, similarly as in step S16 of the fifth embodiment in FIG. 18.

At step S28, the control device 18 performs notification to prompt the user of the image reading apparatus 1 to close the cover 11. The notification may be causing the display of the image reading apparatus 1 to display the message for prompting the user to close the cover 11 or causing the speaker of the image reading apparatus 1 to output the sound for prompting the user to close the cover 11, for example. Then, the operation returns to step S21. In this case, the operation may return to step S21 after the notification of the control device 18 is lifted by the user operation.

The operation of FIG. 19 excluding the document transport and the reading operation may be executed at power-on of the image reading apparatus 1, for example.

As in the above-described operation, the image data acquired for use in the black adjustment process and the black correction process is utilized as the black data, and the image data acquired for use in the white adjustment process and the white correction process is utilized as the white data. Thereby, it is unnecessary to separately acquire the black data and the white data for the process of determining the open state or the closed state of the cover 11, preventing an increase in the processing time of the image reading apparatus 1.

The present invention relates to the following aspects.

According to a first aspect, an image reading apparatus transports a document and reads an image of the document. The image reading apparatus includes a cover, a reading device, and a control device. The cover is openable and closable relative to a particular portion of a transport path for transporting the document. The reading device includes a light source and a sensor. The sensor detects reflected light of light emitted toward the document from the light source and obtains a read value. The control device controls operation of the reading device.

The control device includes an acquisition unit, a first calculation unit, and a determination unit. The acquisition unit acquires, as first data, the read value in a main scanning direction obtained through detection by the sensor with the light source turned off. The acquisition unit acquires, as second data, the read value in the main scanning direction obtained through detection by the sensor with the light source turned on. The first calculation unit calculates a first evaluation value for each of a plurality of locations in the main scanning direction of the first data based on the first data in the plurality of locations in the main scanning direction. The first calculation unit calculates a second evaluation value for each of a plurality of locations in the main scanning direction of the second data based on the second data in the plurality of locations in the main scanning direction. The determination unit determines an open state or a closed state of the cover based on the first evaluation value, and determines the open state or the closed state of the cover based on the second evaluation value. When at least one of a determination result based on the first evaluation value or a determination result based on the second evaluation value indicates the open state of the cover, the determination unit determines that the cover is in the open state. When the determination result based on the first evaluation value and the determination result based on the second evaluation value both indicate the closed state of the cover, the determination unit determines that the cover is in the closed state.

According to a second aspect, in the image reading apparatus of the first aspect, the control device further includes a storage unit and a second calculation unit. The storage unit stores a first reference value and a second reference value. Based on the first reference value, the second calculation unit calculates a first threshold value for threshold determination of the first evaluation value. Based on the second reference value, the second calculation unit calculates a second threshold value for threshold determination of the second evaluation value. The determination unit determines the open state or the closed state of the cover through the threshold determination of the first evaluation value with the first threshold value. The determination unit further determines the open state or the closed state of the cover through the threshold determination of the second evaluation value with the second threshold value.

According to a third aspect, in the image reading apparatus of the second aspect, the first reference value and the second reference value stored in the storage unit are values unique to the image reading apparatus.

According to a fourth aspect, in the image reading apparatus of the third aspect, the control device further includes a third calculation unit. The third calculation unit calculates, from the first reference value, a value with a change over time of the reading device taken into account. The third calculation unit calculates, from the second reference value, a value with the change over time of the reading device taken into account. The second calculation unit calculates the first threshold value based on the value calculated from the first reference value by the third calculation unit. The second calculation unit calculates the second threshold value based on the value calculated from the second reference value by the third calculation unit.

According to a fifth aspect, in the image reading apparatus of the second aspect, the control device further includes an updating unit. When the closed state of the cover is determined by the determination unit, the updating unit updates the first reference value stored in the storage unit with the first evaluation value calculated by the first calculation unit as a new first reference value, and updates the second reference value stored in the storage unit with the second evaluation value calculated by the first calculation unit as a new second reference value.

According to a sixth aspect, in the image reading apparatus of one of the first to fifth aspects, the acquisition unit acquires the read value at least in the main scanning direction as each of the first data and the second data. The first calculation unit calculates, as the first evaluation value, a mean value in each of a plurality of particular sections at least in the main scanning direction of the first data, and calculates, as the second evaluation value, a mean value in each of a plurality of particular sections at least in the main scanning direction of the second data.

According to a seventh aspect, in the image reading apparatus of one of the first to fifth aspects, the first calculation unit calculates, as the first evaluation value, a peak value in each of a plurality of particular sections in the main scanning direction of the first data, and calculates, as the second evaluation value, a peak value in each of a plurality of particular sections in the main scanning direction of the second data.

According to an eighth aspect, in the image reading apparatus of one of the first to seventh aspects, when the open state of the cover is determined by the determination unit, the control device notifies the open state of the cover. After the notification of the control device, the determination unit determines the open state or the closed state of the cover. When the open state of the cover is determined a particular number of times, the determination unit determines anomaly in the reading device.

According to a ninth aspect, in the image reading apparatus of one of the first to eighth aspects, the first calculation unit uses image data for use in a black adjustment process and a black correction process as the first data, and uses image data for use in a white adjustment process and a white correction process as the second data.

According to at least one of the embodiments of the present invention, the open state or the closed state of the cover is determined with improved accuracy without a sensor that detects the open state or the closed state of the cover.

In each of the foregoing embodiments and modified examples, if at least one of the functions of the image reading apparatus 1 is implemented by the execution of a program, the program is provided as previously stored in a storage device such as a read only memory (ROM). Further, in each of the embodiments and modified examples, the program executed by the image reading apparatus 1 may be provided as recorded on a computer readable recording medium, such as a compact disc-ROM (CD-ROM), a flexible disk (FD), a CD-recordable (CD-R), or a digital versatile disc (DVD), in an installable or executable file format. Further, in each of the embodiments and modified examples, the program executed by the image reading apparatus 1 may be stored in a computer connected to a network such as the Internet and be provided as downloaded via the network, or may be provided or distributed via a network such as the Internet. Further, in each of the embodiments and modified examples, the program executed by the image reading apparatus 1 is configured as modules including at least one of the above-described functional units. As an actual hardware configuration, a CPU reads and executes the program from the above-described storage device to load and generate the above-described functional units on a main storage device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image reading apparatus comprising:
a cover configured to be openable and closable relative to a particular portion of a transport path for transporting a document;
a reading device including
a light source, and
a sensor configured to detect reflected light of light emitted toward the document from the light source and obtain a read value; and
a control device configured to control operation of the reading device,
the control device including circuitry configured to
acquire, as first data, the read value in a main scanning direction obtained through detection by the sensor with the light source turned off,
acquire, as second data, the read value in the main scanning direction obtained through detection by the sensor with the light source turned on,
calculate a first evaluation value for each of a plurality of locations in the main scanning direction of the first data based on the first data in the plurality of locations in the main scanning direction,
calculate a second evaluation value for each of a plurality of locations in the main scanning direction of the second data based on the second data in the plurality of locations in the main scanning direction,
determine an open state or a closed state of the cover based on the first evaluation value,
determine the open state or the closed state of the cover based on the second evaluation value,
when at least one of a determination result based on the first evaluation value or a determination result based on the second evaluation value indicates the open state of the cover, determine that the cover is in the open state, and
when the determination result based on the first evaluation value and the determination result based on the second evaluation value both indicate the closed state of the cover, determine that the cover is in the closed state.

2. The image reading apparatus of claim 1, wherein the control device further includes a memory that stores a first reference value and a second reference value, and
wherein the circuitry
calculates a first threshold value for threshold determination of the first evaluation value based on the first reference value,
calculates a second threshold value for threshold determination of the second evaluation value based on the second reference value,
determines the open state or the closed state of the cover through the threshold determination of the first evaluation value with the first threshold value, and
determines the open state or the closed state of the cover through the threshold determination of the second evaluation value with the second threshold value.

3. The image reading apparatus of claim 2, wherein the first reference value and the second reference value stored in the memory are values unique to the image reading apparatus.

4. The image reading apparatus of claim 3, wherein the circuitry of the control device
calculates, from the first reference value, a value with a change over time of the reading device taken into account, calculates, from the second reference value, a value with the change over time of the reading device taken into account,
calculates the first threshold value based on the value calculated from the first reference value, and
calculates the second threshold value based on the value calculated from the second reference value.

5. The image reading apparatus of claim 2, wherein when the closed state of the cover is determined, the circuitry of the control device
updates the first reference value stored in the memory with the calculated first evaluation value as a new first reference value, and
updates the second reference value stored in the memory with the calculated second evaluation value as a new second reference value.

6. The image reading apparatus of claim 1, wherein the circuitry of the control device
acquires the read value at least in the main scanning direction as each of the first data and the second data,
calculates, as the first evaluation value, a mean value in each of a plurality of particular sections at least in the main scanning direction of the first data, and
calculates, as the second evaluation value, a mean value in each of a plurality of particular sections at least in the main scanning direction of the second data.

7. The image reading apparatus of claim 1, wherein the circuitry of the control device
calculates, as the first evaluation value, a peak value in each of a plurality of particular sections in the main scanning direction of the first data, and
calculates, as the second evaluation value, a peak value in each of a plurality of particular sections in the main scanning direction of the second data.

8. The image reading apparatus of claim 1, wherein when the open state of the cover is determined, the circuitry of the control device
notifies the open state of the cover,
determines the open state or the closed state of the cover after the notification of the control device, and
when the open state of the cover is determined a particular number of times, determines anomaly in the reading device.

9. The image reading apparatus of claim 1, wherein the circuitry of the control device
uses image data for use in a black adjustment process and a black correction process as the first data, and
uses image data for use in a white adjustment process and a white correction process as the second data.

\* \* \* \* \*